United States Patent [19]

Hanaoka et al.

[11] Patent Number: 5,570,086
[45] Date of Patent: Oct. 29, 1996

[54] DATA CARRIER SYSTEM

[75] Inventors: Tadashi Hanaoka, Koganei; Haruhiko Higuchi, Tokorozawa, both of Japan

[73] Assignee: Citizen Watch Co., Ltd., Tokyo, Japan

[21] Appl. No.: 137,017

[22] PCT Filed: Feb. 18, 1993

[86] PCT No.: PCT/JP93/00200

§ 371 Date: Oct. 15, 1993

§ 102(e) Date: Oct. 15, 1993

[87] PCT Pub. No.: WO93/16444

PCT Pub. Date: Aug. 19, 1993

[30] Foreign Application Priority Data

Feb. 18, 1992 [JP] Japan ................................. 4-060917
Jul. 24, 1992 [JP] Japan ................................. 4-057444 U

[51] Int. Cl.⁶ .............................. H04L 7/033; H04Q 9/04; G08B 7/06
[52] U.S. Cl. ..................................... 340/825.54; 340/572
[58] Field of Search ........................ 340/825.54, 825.55, 340/825.31, 825.34, 572, 539; 235/375, 382, 382.5, 385; 343/895; 455/60, 69, 70

[56] References Cited

U.S. PATENT DOCUMENTS

| | | | |
|---|---|---|---|
| 3,964,024 | 6/1976 | Hutton et al. | 340/825.34 |
| 3,969,732 | 7/1976 | Holloway | 343/895 |
| 4,129,855 | 12/1978 | Rodrian | 340/825.34 |
| 4,857,893 | 8/1989 | Carroll | 340/572 |
| 5,028,918 | 7/1991 | Giles et al. | 340/825.54 |
| 5,061,941 | 10/1991 | Lizzi et al. | 340/572 |
| 5,221,831 | 6/1993 | Geiszler | 340/572 |
| 5,235,326 | 8/1993 | Beigel et al. | 340/825.54 |
| 5,337,040 | 8/1994 | Kind | 340/572 |
| 5,349,339 | 9/1994 | Kind | 340/572 |

FOREIGN PATENT DOCUMENTS

| | | |
|---|---|---|
| 0 241 148 | 10/1987 | European Pat. Off. |
| 0 289 136 A2 | 11/1988 | European Pat. Off. |
| 0 461 878 A2 | 12/1991 | European Pat. Off. |
| 58-154082 | 9/1983 | Japan . |
| 58-154080 | 9/1983 | Japan . |
| 58-151722 | 9/1983 | Japan . |
| 58-154081 | 9/1983 | Japan . |
| 1-19490 | 1/1989 | Japan . |
| 2-291091 | 11/1990 | Japan . |
| 3-171384 | 7/1991 | Japan . |
| 3-273465 | 12/1991 | Japan . |
| 4-692 | 1/1992 | Japan . |
| 4-18689 | 1/1992 | Japan . |
| WO88/03295 | 5/1988 | WIPO . |

*Primary Examiner*—Alyssa H. Bowler
*Assistant Examiner*—Mark H. Rinehart
*Attorney, Agent, or Firm*—Finnegan, Henderson, Farabow, Garrett and Dunner

[57] ABSTRACT

A data carrier system which uses a power sourceless electromagnetically coupled data carrier, wherein two-way data communication is made possible between a fixed facility and a data carrier. Provision is made for a synchronizing means which renders the frequencies and phases of AC magnetic fields emitted from the fixed facilities to be the same among a plurality of fixed facilities, such that interference will not take place among the plurality of fixed facilities even when they are arranged close to one another. Moreover, the electric power induced in the antenna of the fixed facility by the AC magnetic field generated from the data carrier is synchronously detected by using a synchronizing signal controlled by said synchronizing means.

26 Claims, 24 Drawing Sheets

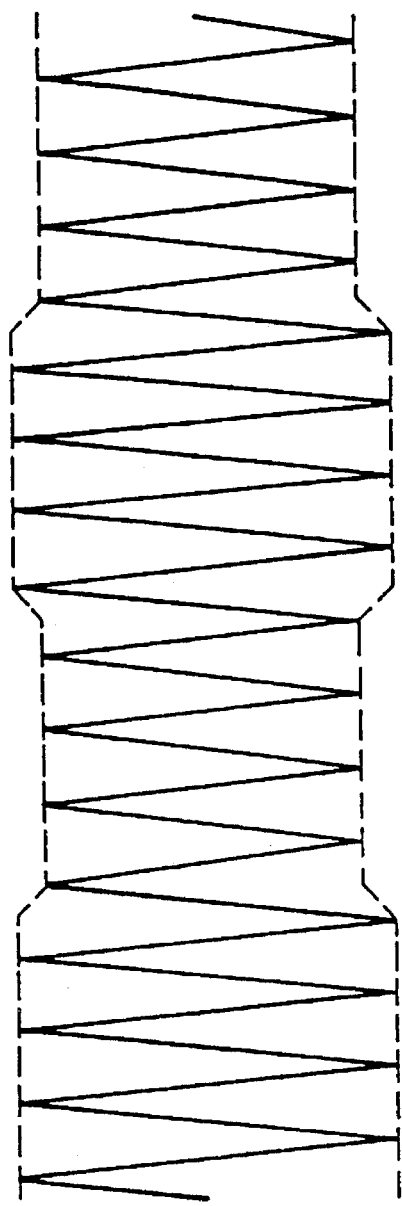
FIG. 9(A) $V_o$
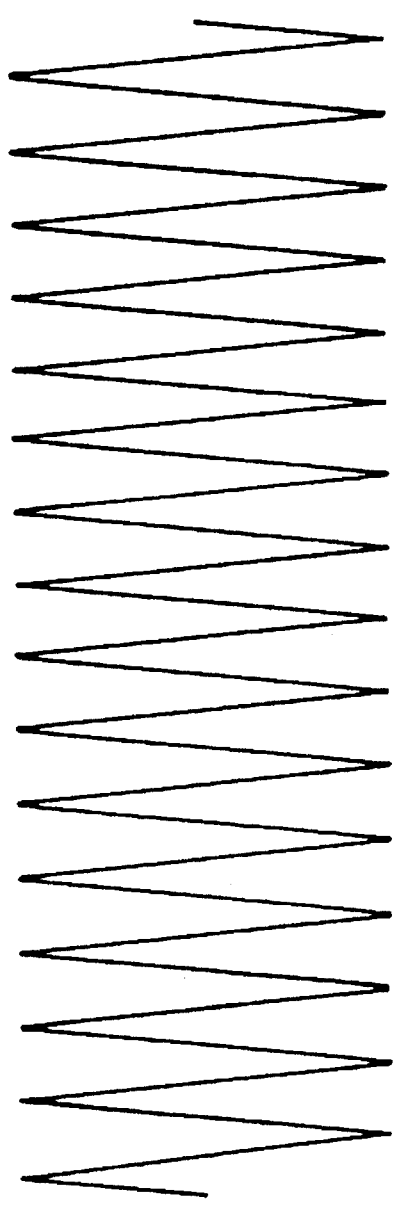
FIG. 9(B) $V_s$
FIG. 9(C) $V_c$

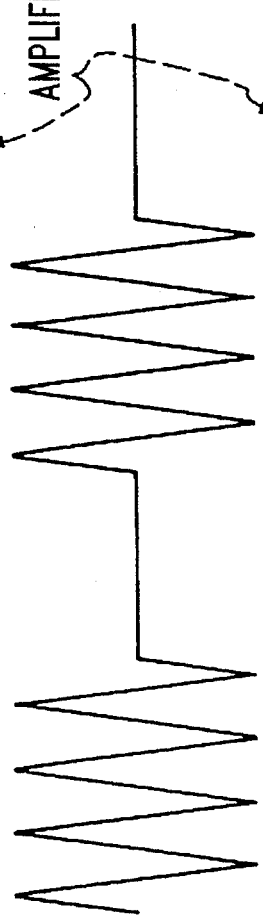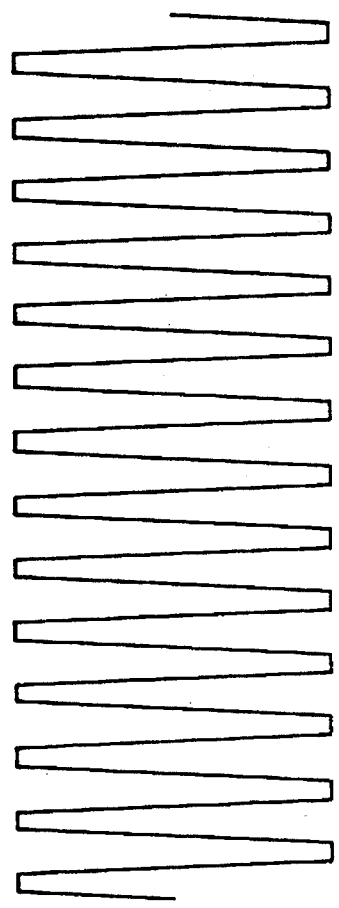
FIG. 10(A) $V_c$
FIG. 10(B) $V_a$
FIG. 11(A) $V_c$
FIG. 11(B) $V_a$
AMPLIFICATION LIMIT FIG. 15(A) $D_s$ 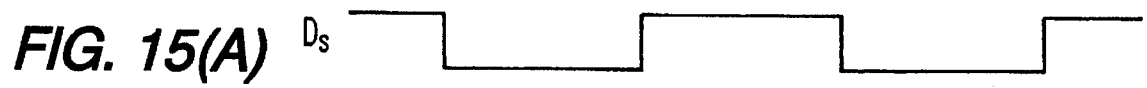
FIG. 15(B) $D_o$ 
FIG. 15(C) Q 
FIG. 15(D) QB 
FIG. 15(E) $D_s1$ 
FIG. 15(F) $C_s1$ 
FIG. 16(A) $D_s$ 
FIG. 16(B) $D_o$ 
FIG. 16(C) Q 
FIG. 16(D) QB 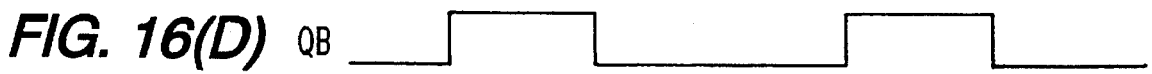
FIG. 16(E) $D_s1$ 
FIG. 16(F) $C_s1$ 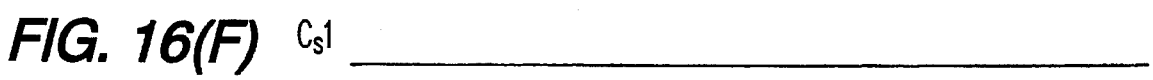

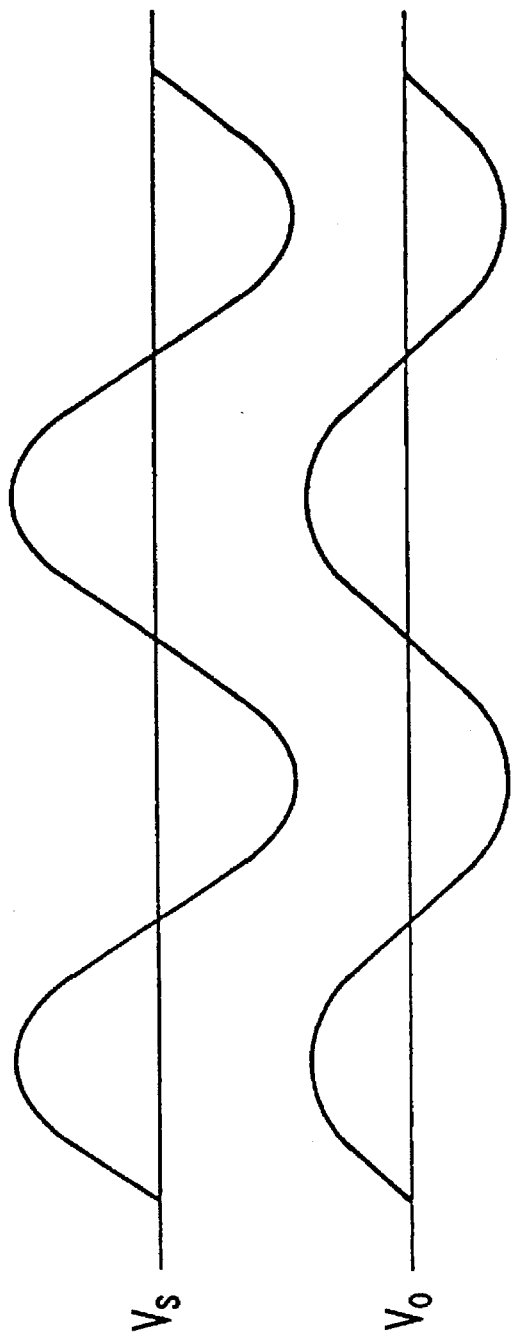
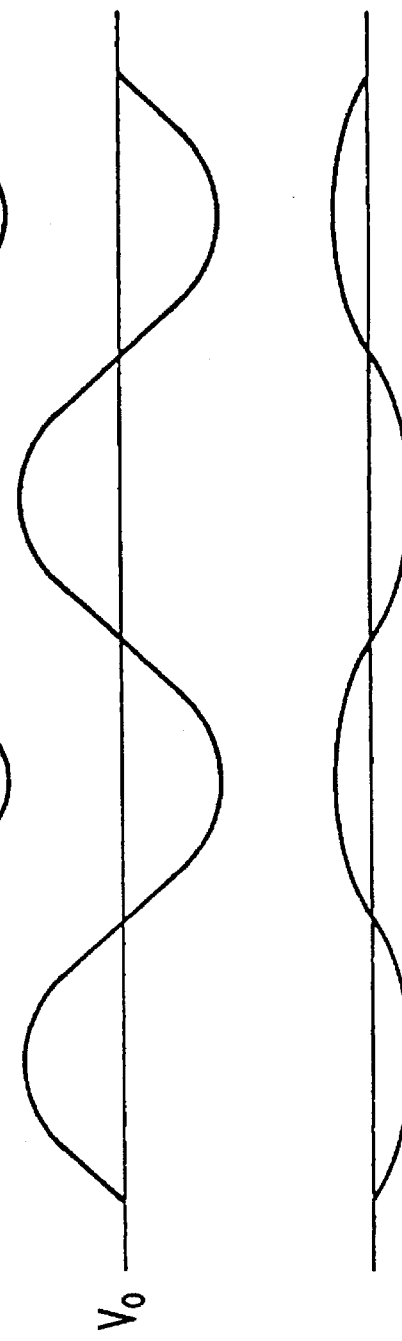
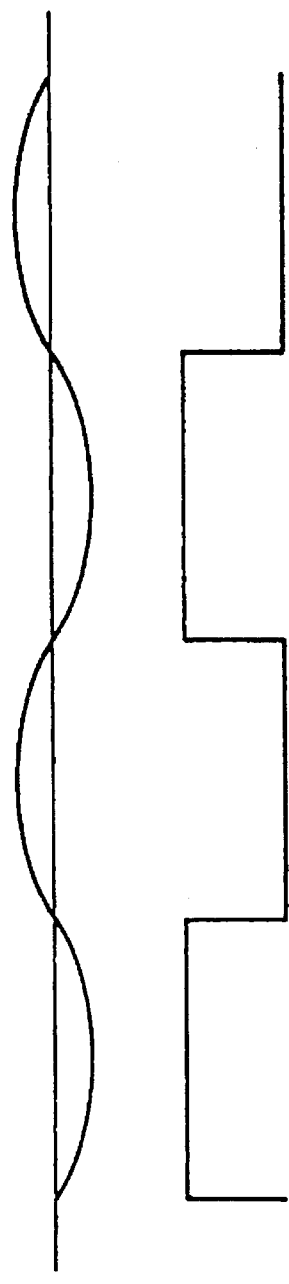
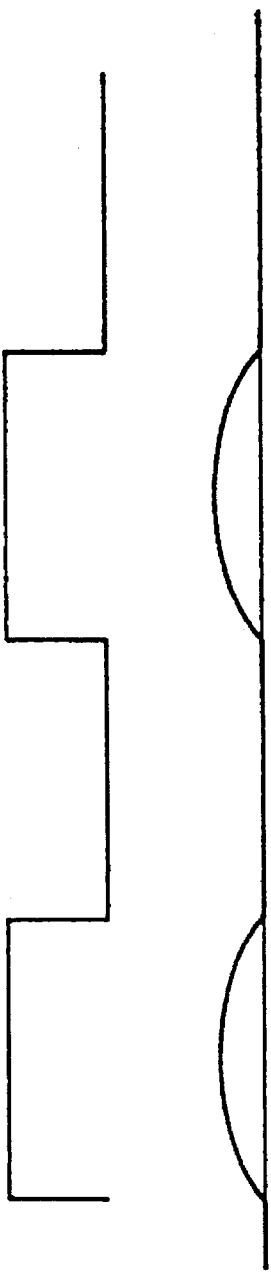
FIG. 17(A)  $V_S$
FIG. 17(B)  $V_0$
FIG. 17(C)
FIG. 17(D)
FIG. 17(E)

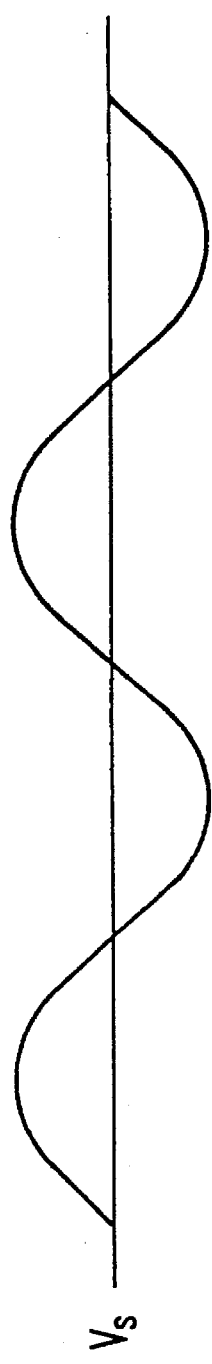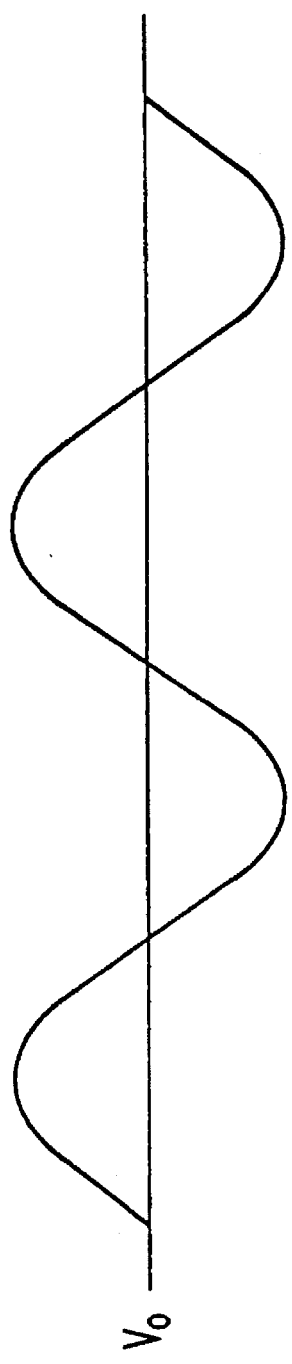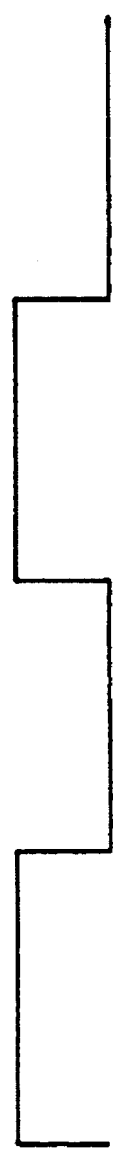
FIG. 18(A)  $V_S$
FIG. 18(B)  $V_O$
FIG. 18(C)
FIG. 18(D)
FIG. 18(E)

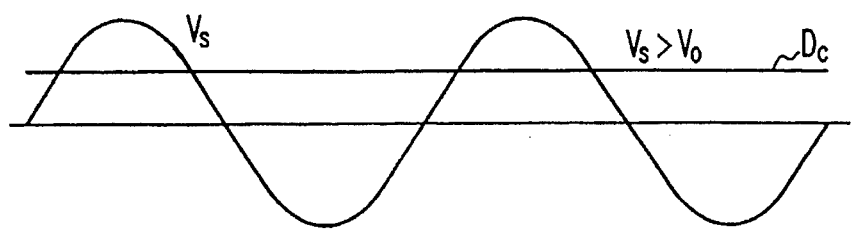
FIG. 19(A)
FIG. 19(B)
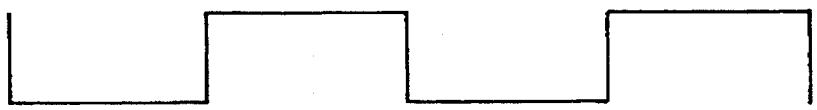
FIG. 19(C) $\overline{D_s}$
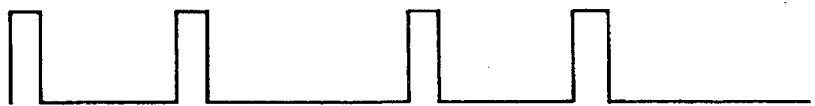
FIG. 19(D)
FIG. 19(E)
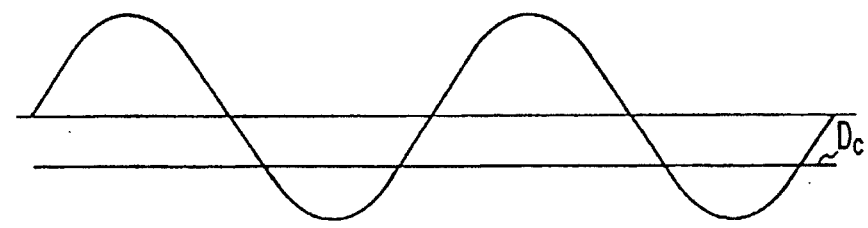
FIG. 20(A)
FIG. 20(B)
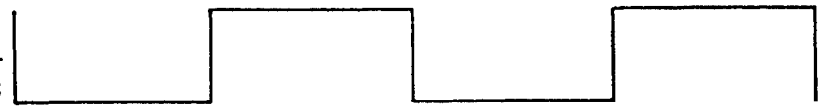
FIG. 20(C) $\overline{D_s}$
FIG. 20(D)
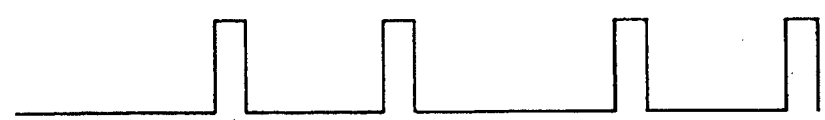
FIG. 20(E)

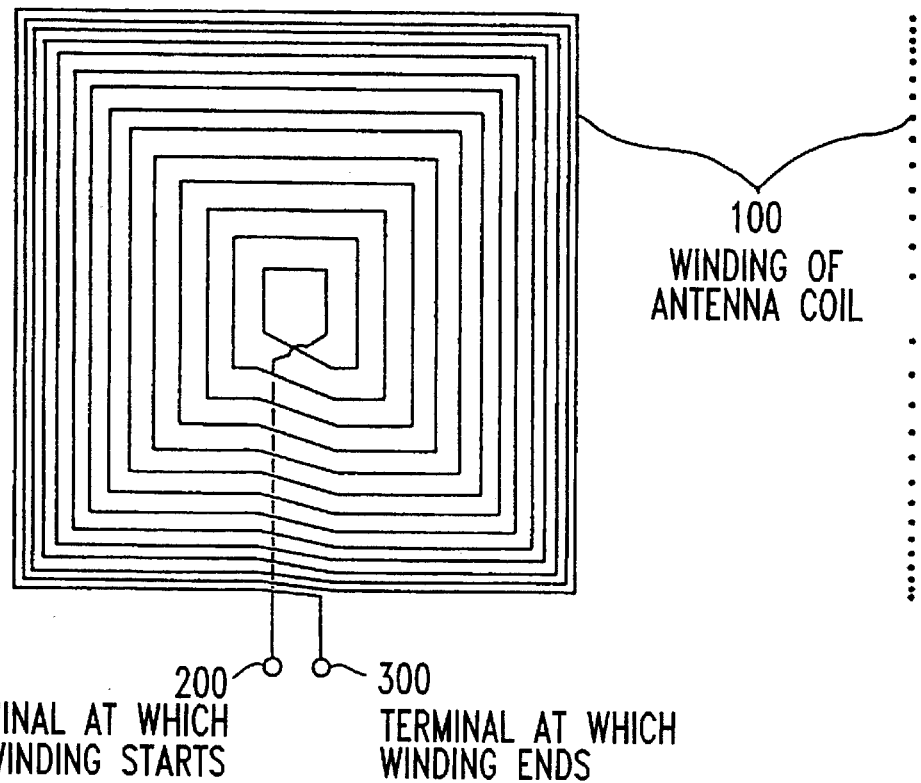
FIG. 24(A)  FIG. 24(B)
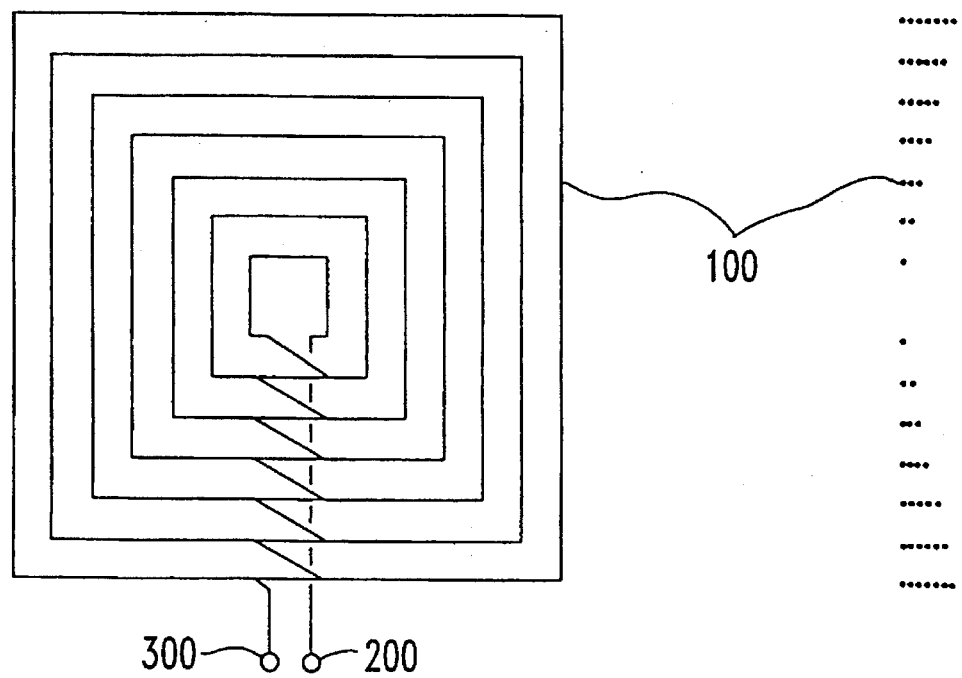
FIG. 25(A)  FIG. 25(B)

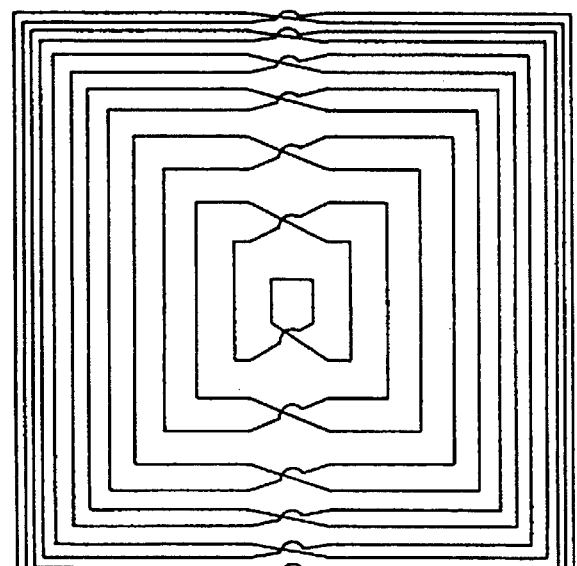
*FIG. 26*
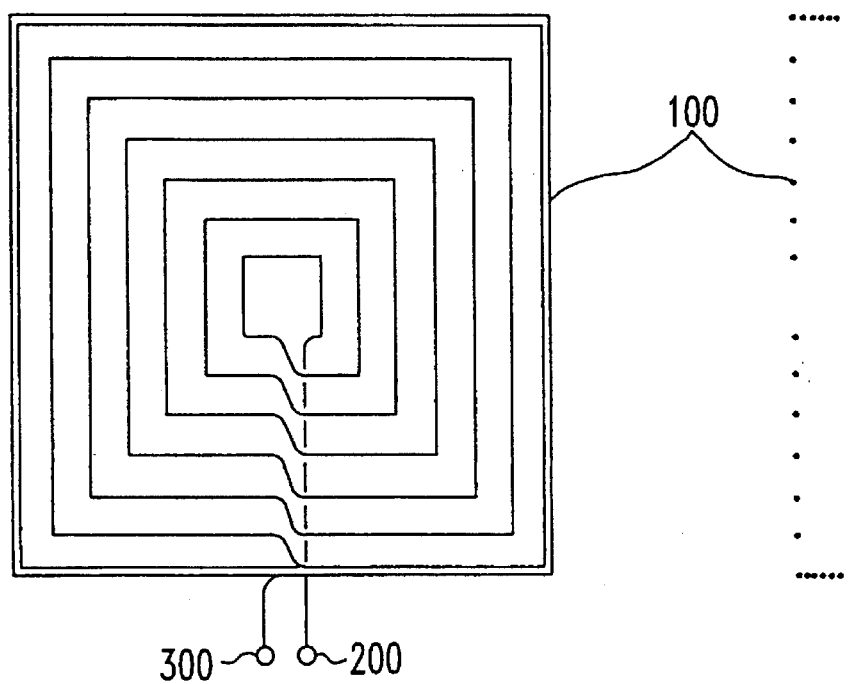
*FIG. 27(A)*   *FIG. 27(B)*

DATA CARRIER SYSTEM

TECHNICAL FIELD

The present invention relates to fixed facilities that carry out two-way communication of data in a noncontacting manner with respect chiefly to power sourceless data carriers which are distant by more than several centimeters, the distance being always subject to change. Particularly, the invention relates to a countermeasure for preventing interference among the fixed facilities that can develop when a plurality of fixed facilities are arranged within a short distance from each other and when the individual fixed facilities communicate with the data carriers.

BACKGROUND ART

A variety of systems using data carrier of the electromagnetically coupled type have heretofore been proposed depending upon the communication systems and the power source systems. First, the power source systems can be divided into those of the cell-containing type in which the data carrier contains a cell and the power sourceless type which does not contain the cell but which receives an electromagnetic signal transmitted from the fixed facility and rectifies the signal to obtain a voltage that serves as a power source. The communication systems can be divided into those of the one-way communication type in which the data stored in the data carrier are transmitted to the fixed facility and those of the two-way communication type in which the data stored in the data carrier can be rewritten depending upon the data transmitted from the fixed facility; and the data can also be transmitted from the data carrier to the fixed facility. Moreover, the two-way communication systems can be classified into those of the two-frequency type in which a frequency of an AC magnetic field generated by the fixed facility is different from a frequency of an AC magnetic field generated by the data carrier and those of the one-frequency type which use the same frequency. The present invention is chiefly concerned with a power sourceless two-way communication system which uses only one frequency.

Described below are conventional examples of each of the above-mentioned systems. First, the two-way communication systems to which the present invention is concerned have been disclosed in Japanese Unexamined Patent Publications (Kokai) Nos. 2-291091, 3-273465 and 4-692. There have further been proposed power sourceless two-way communication systems that resemble the present invention, and Japanese Examined Patent Publication (Kokoku) No. 3-12353 discloses the one which is of the two-frequency type. Moreover, those of the power sourceless one-way communication type have been disclosed in Japanese Examined Patent Publications (Kokoku) Nos. 3-19591, 3-12352, U.S. Pat. Nos. 3,964,024 and 4,129,855. In particular, Japanese Examined Patent Publication (Kokoku) No. 3-25832 discloses a communication system of the power sourceless one-frequency one-way type to which the present invention is related. However, all of the above-mentioned prior art documents employ only one fixed facility and one data carrier, and do not give any attention concerning the problem of interference among fixed facilities that develops when the individual fixed facilities communicate simultaneously with the data carriers.

The problem of interference among the fixed facilities which will be considered below is the principal object of the present invention over the aforementioned prior art. First, Japanese Unexamined Patent Publications (Kokai) Nos. 2-291091, 3-273465 and 4-692 simply disclose the idea of two-way communication systems but do not at all concretely disclose the communication systems. On account of their cell-containing system, however, it is considered that these prior art disclosures must employ the two-frequency system. Japanese Examined Patent Publication (Kokoku) No. 3-12353 employs the two-frequency system as described above. In the case of the two-frequency system, the problem of interference among the fixed facilities can be avoided by separating the two kinds of frequencies using different filters, as is well known.

In the case of the one-way communication system, the problem of interference among the fixed facilities does not develop even when it is of the power sourceless one-frequency type (Japanese Examined Patent Publication (Kokoku) No. 3-25832) which resembles the present invention as will be described with reference to FIG. 28.

FIG. 28(B) shows transmitted and received waveforms in a power sourceless one-way communication system disclosed in Japanese Examined Patent Publication (Kokoku) No. 3-25832 of the case where a fixed facility G2 is disposed close to a set of a fixed facility G1 and a data carrier C1 that is shown in FIG. 28(A) in the one-frequency type data carrier system.

In FIG. 28, GTS1 represents an AC magnetic field that is transmitted to the data carrier C1 from the fixed facility G1, i.e., represents unmodulated AC signals for feeding electric power without transmitting data. CDS1 represents data signals of the data carrier C1, and CTS1 represents an AC magnetic field transmitted to the fixed facility G1 from the data carrier C1 and which is obtained by modulating the AC signals of the same frequency as the GTS1 with the data signals CDS1. GTS1-1 represents data signals of the fixed facility G1 which are detected upon receiving the AC magnetic field CTS1. GTS2 represents an AC magnetic field transmitted from the fixed facility G2, i.e., represents unmodulated AC signals for feeding electric power without transmitting data like the above GTS1. GKS1 represents an interference signal of the fixed facility G1 which is obtained by receiving the AC magnetic field GTS2 transmitted from the fixed facility G2 and is detected by the fixed facility G1. Since GTS2 is an unmodulated AC signal, the interference signal GKS1-2 which is detected therefrom is under the condition of no signal. GKS-1 represents total data signals of the fixed facility G1 obtained by adding the detected signals GKS1-1 of AC magnetic field CTS1 transmitted from the data carrier C1 and the interference signal GKS1-2 from the fixed facility G2 together. In the case of the one-way communication system, the AC magnetic field GTS2 of the fixed facility G2 forms unmodulated AC signals, and there exists no interference signal GKS1-2 in the fixed facility G1. Therefore, the total data signals GKS1 have the same waveform as the data signals GKS1-1, and there develops no problem of interference from the other fixed facility G2.

In the case of the one-frequency two-way communication system in which a plurality of fixed facilities G1, G2, . . . , Gv are arranged close to one another, the AC magnetic fields GTS1 and GTS2 from the fixed facilities in FIG. 28 are modulated with data signals. Therefore, the modulated AC magnetic fields from the fixed facilities are received as interference signals by the antennas of other fixed facilities that have a resonance characteristic at the same frequency.

As a result, the total data signals of the fixed facility that has received the interference signal become different from the data signals which are obtained by detecting the signals transmitted from the data carrier, and it becomes difficult to read out correct data.

That is, concretely speaking, the system which uses the power sourceless electromagnetically coupled data carrier has been put into practical use only in a manner in which the communication is made one way from the data carrier to the fixed facility. In many of these systems, the AC magnetic field generated by the fixed facility is not modulated and the field of synthesizing the AC magnetic fields established by a plurality of fixed facilities is not modulated, either. Therefore, the fixed facilities do not interfere with each other, and the data communication is not disturbed. In a system of the type in which the AC magnetic field generated by the fixed facility has a frequency different from that of the AC magnetic field generated by the data carrier, the data signals are separated, relying upon the filter technology, since the AC magnetic field generated by the data carrier has a frequency different from the frequency of the AC magnetic field generated by the fixed facilities. This makes it possible to preclude the effect of AC magnetic fields generated by the fixed facilities which are close to each other.

When the data are transmitted to the data carrier by modulating an AC magnetic field generated from the fixed facility, a very great change takes place in the AC magnetic field, causing a change in the electromotive force induced in the antenna coils of neighboring fixed facilities, though they are located considerably far away. Since the frequency of the AC magnetic field generated by the data carrier is the same as the frequency of the AC magnetic field generated from the fixed facility, it is very difficult to distinguish a change in the induced electromotive force from a change in the electromotive force induced by the AC magnetic field generated by the data carrier. It has therefore been considered difficult to read correct data from the data carrier. On the other hand, when the AC magnetic fields generated by the data carrier and the fixed facility have different frequencies, the electromotive forces induced by the two AC magnetic fields can be separated relying upon the filter technology. With the data carrier of this system, however, the AC magnetic field that is output is so weak that it is subject to be affected by external noise and the communication is limited to short distances.

The data carrier system which uses the power sourceless electromagnetically coupled data carrier has not been realized in a form which permits two-way data communication between the data carrier and the fixed facility. The present inventors have developed an electromagnetically coupled data carrier which mounts a nonvolatile memory of high performance which is called C-MOS-IC that consumes very small power and which is devised in a sophisticated manner to rewrite the memory, and have developed a fixed facility for the electromagnetically coupled data carrier as a result of contrivance. The object of the present invention therefore is to solve the above-mentioned problem and to provide a data carrier system which uses an electromagnetically coupled data carrier primarily of chiefly the power sourceless two-way communication type, and in which the AC magnetic field of one frequency is employed for communication between the fixed facility and the data carrier to increase the distance of communication and to read out correct data from the data carrier even when interfered with by modulated AC magnetic fields from other neighboring fixed facilities.

DISCLOSURE OF THE INVENTION

The object of the present invention is to improve defects inherent in the above-mentioned prior art by providing a data carrier system which uses the power sourceless electromagnetically coupled data carriers. When the data are to be two-way communicated between the fixed facilities and the data carriers, the frequencies of the AC magnetic fields generated by the fixed facilities are set to be equal to the frequency of the AC magnetic field generated by the data carriers in order to increase the distance of communication. The data are correctly received by a neighboring second fixed facility from the data carrier even in case the second fixed facility is affected by the AC magnetic field on which are superposed the data generated from the first fixed facility.

That is, in order to achieve the above object, the present invention basically employs the following technical constitution. That is, a data carrier system comprising electromagnetically coupled data carriers and fixed facilities that effect two-way data communication relative to said data carriers, wherein said fixed facilities have a selective detecting means which detects data signals from the data carriers only by discriminating the data signals induced by the AC magnetic field generated from the data carriers out of the signals induced by AC magnetic fields from other fixed facilities.

In order to solve the problems of the above prior art that develop when a plurality of the aforementioned fixed facilities are arranged neighboring each other, furthermore, the present invention provides a data carrier system in which the fixed facilities are arranged in a plurality of numbers neighboring each other, and provision is made of a control means which renders the frequencies and phases of the AC magnetic fields generated from the fixed facilities to transmit data to the data carriers to be the same among said plurality of fixed facilities. More concretely speaking, the invention provides a data carrier system in which the control means is a common signal-forming means which forms the same AC signals that are sources for generating AC magnetic fields from the fixed facilities.

BRIEF DESCRIPTION OF DRAWINGS

FIGS. 9(A–C) is a waveform diagram explaining the operation of a subtraction circuit;

FIGS. 10(A–B) is a waveform diagram explaining the operation of an amplifier circuit when a voltage-adjusting circuit is adjusted to an optimum condition;

FIGS. 11(A–B) is a waveform diagram explaining the operation of the amplifier circuit when the voltage-adjusting circuit is out of adjustment;

FIGS. 15(A–F) is a time chart showing the operation of a phase detecting circuit when the phase of a waveform of a received signal Vo is advancing ahead of a reference signal Vs;

FIGS. 16(A–F) is a time chart showing the operation of the phase detecting circuit when the phase of the received signal Vo is delayed behind the reference signal Vs;

FIGS. 17(A–E) is a diagram of waveforms illustrating the operation a synchronizing signal detecting circuit of when the amplitude of the waveform of the reference signal Vs is greater than that of the received signal Vo;

FIGS. 18(A–E) is a diagram of waveforms illustrating the operation of the synchronizing signal detecting circuit when the amplitude of the waveform of the reference signal Vs is smaller than that of the received signal Vo;

FIGS. 19(A–E) is a diagram of waveforms illustrating the operation of a DC converter circuit when the amplitude of the waveform of the reference signal Vs is greater than that of the received signal Vo;

FIGS. 20(A–E) is a diagram of waveforms illustrating the operation of the DC converter circuit when the amplitude of the waveform of the reference signal Vs is smaller than that of the received signal Vo;

FIGS. 24(A–B) is a plan view of an antenna coil according to a first embodiment of the present invention and a side view thereof;

FIGS. 25(A–B) is a plan view of the antenna coil according to a second embodiment of the present invention and a side view thereof;

FIG. 26 is a plan view of the antenna coil according to a third embodiment of the present invention;

FIGS. 27(A–B) is a plan view of the antenna coil according to a fourth embodiment of the present invention and a side view thereof;

BEST MODE FOR CARRYING OUT THE INVENTION

Several of embodiments according to the present invention will now be described in detail with reference to the drawings.

The data carrier system used in the present invention refers to the one in which the data are communicated in a non-contacting manner maintaining a distance of several centimeters or more between a communication terminal called fixed facility and a movable or portable carrier which is capable of recording and outputting the data such as of an IC card, an IC ticket, as well as a data tag for industrial uses, a name plate with an ID function and a variety of prepaid cards.

The data carrier system can be utilized for an automatic management system which deals with many and unspecified objects such as coupon tickets, passenger tickets, commutation tickets for every means of transportation, coupon tickets for a ski lift in a skiing area, admission tickets for a recreation ground and an exhibition ground, tickets for utilizing facilities, or can be utilized for automatically managing the breeding of many and unspecified animals.

The data carrier system according to the present invention basically comprises electromagnetically coupled data carriers and fixed facilities that make two-way data communication relative to the data carriers, wherein the fixed facilities have a selective detecting means that detects data signals from the data carrier only by discriminating data signals induced by an AC magnetic field generated from the data carrier out of signals induced by AC magnetic fields from other fixed facilities. In order to solve the problem that arises when a plurality of fixed facilities are arranged neighboring each other, furthermore, the data carrier system of the present invention comprises a plurality of fixed facilities which are arranged neighboring each other, and provision is made for a control means which sets the frequencies and phases of the AC magnetic fields generated by the fixed facilities to transmit data to the carriers to be the same among said plurality of fixed facilities.

Figure 3:
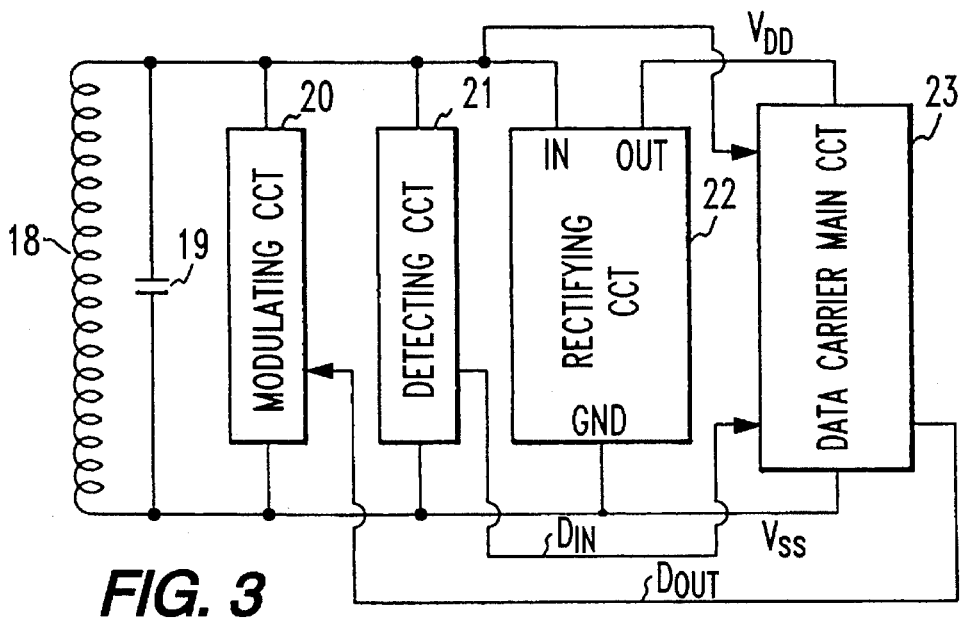
FIG. 3 is a block diagram of a circuit of an electromagnetically coupled data carrier used for the data carrier system according to an embodiment of the present invention.

The problem of the data carrier system to which the present invention relates will be described below in further detail. First, FIG. 3 is a block diagram of a circuit of an electromagnetically coupled data carrier used for the data carrier system with which the invention is concerned. This data carrier is of the so-called resonance condition control type and has an LC resonance circuit which consists of a coil 18 and a capacitor that are magnetically coupled to the fixed facilities. The electric power induced in the resonance circuit due to the AC magnetic field from the fixed facility is rectified through a rectifier circuit and is used as a power source voltage Vdd for a data carrier main circuit 23. A data signal, transmitted by being superposed on the AC magnetic field from the fixed facility near the data carrier, is demodulated by detecting a terminal voltage of the resonance circuit through a detector circuit, and is transmitted as an input signal Din to the data carrier main circuit. The data carrier main circuit sends an output data Dout to a modulating circuit 20 to change its impedance, whereby the resonance condition of the resonance circuit is changed to increase or decrease the current that flows through the coil 18. A change in the current causes the AC magnetic field to change around the data carrier, and a change in the AC magnetic field causes the electric power that is induced in the antenna coil of the fixed facility to change.

Figure 2:
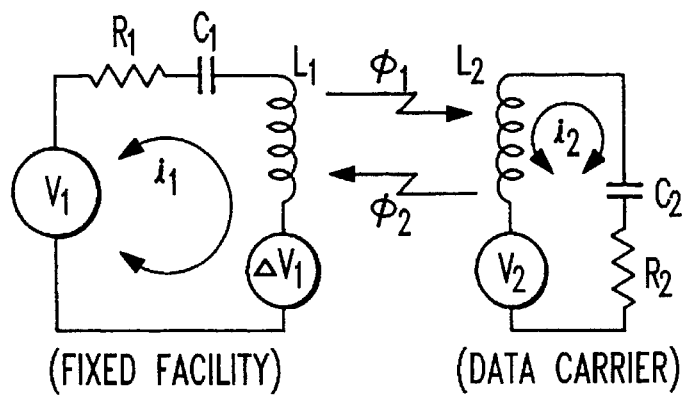
FIG. 2 is a diagram of voltage and current distributions for explaining the principle of operation in a data carrier system.

FIG. 2 illustrates a model of the situation where data are exchanged between the above-mentioned data carrier and the fixed facility, relying upon the electromagnetically coupled system.

That is, FIG. 2 is a circuit diagram which illustrates a phase relation of an AC current that flows into an antenna coil of a fixed facility in the data carrier system in relation to the characteristics of the data carrier. In FIG. 2, the circuit at the left side is that of the antenna coil of a fixed facility and a drive circuit therefor, and the circuit at the right side is a resonance circuit of the data carrier. In the fixed facility, the output voltage v1 of the antenna drive circuit (hereinafter referred to as drive voltage) is defined by the following equation (1)

$$v1 = V1 \sin(\omega 0 t) \tag{Eq. 1}$$

where V1 denotes a voltage amplitude, $\omega 0$ denotes an angular frequency, and t denotes the time.

Let the inductance of the antenna coil be denoted by L1, the capacitance of a resonance capacitor connected in series with the antenna coil by C1, and the resistance of the antenna coil by R1. Here, if the electromotive force $\Delta v1$ induced in the antenna coil by the AC magnetic field generated by the data carrier is once neglected, then the current i1 that flows through the antenna coil is given by the following equation (2)

$$i1 = \frac{v1}{Z1} = \frac{V1\sin(\omega 0 t)}{R1 + j\omega L1 + \frac{1}{j\omega C1}} \tag{2}$$

where Z1 denotes a load impedance of the antenna drive circuit.

Here, if L1 and C1 are so selected that a series circuit of the antenna coil and the resonance capacitor resonates at the frequency of the drive voltage v1, then Z1=R1 whereby the equation (2) can be rewritten as the following equation (3)

$$i1 = \frac{V1\sin(\omega 0 t)}{R1} \tag{3}$$

from which it will be understood that the phase of the current i1 of the antenna coil is equal to the phase of the drive voltage v1.

The intensity $\phi 1$ of the AC magnetic field generated from the antenna coil varies in proportion to the current i1 of the antenna coil as given by the following equation (4)

$$\phi 1 = \frac{\alpha V1\sin(\omega 0 t)}{R1} = \Phi 1\sin(\omega 0 t) \tag{4}$$

where $\alpha$ denotes a constant determined by the shape of the antenna coil and the distance from the antenna coil, and $\phi 1$ denotes the amplitude of the AC magnetic field of the antenna coil.

The electromotive force v2 induced in the resonance circuit of the data carrier due to the AC magnetic field varies in proportion to the differentiated value of the intensity $\phi 1$ of the AC magnetic field. Therefore, the following equation (5) is derived from the equation (4)

$$v2 = \beta\frac{d\phi 1}{dt} = \frac{\beta d[\Phi 1\sin(\omega 0 t)]}{dt} \tag{5}$$
$$= V2\cos(\omega 0 t) = V2\sin(\omega 0 t + \pi/2)$$

where $\beta$ is a constant determined by the shape of coil in the data carrier, and V2 denotes the amplitude of the electromotive force v2.

As will be obvious from the above equation (5), the phase of the electromotive force v2 induced in the resonance circuit of the data carrier is advanced ahead of the phase of the drive voltage v1 in the fixed facility by 90°. In the data carrier, if the inductance of the coil is selected to be L2, the capacitance of the resonance capacitor to be C2, the resistance of the coil to be R2, and L2 and C2 to be such values that satisfy the resonance condition, then the current i2 that flows through the coil is given by the following equation (6)

$$i2 = \frac{V2\sin(\omega 0 t + \pi/2)}{R2 + j\omega L2 + \frac{1}{j\omega C2}} \tag{6}$$
$$= \frac{V2\sin(\omega 0 t + \pi/2)}{R2}$$

The intensity $\phi 2$ of an AC magnetic field generated by the current that flows through the coil of the data carrier is given by the following equation (7)

$$\phi 2 = \Phi 2 \sin(\omega 0 t + \pi/2) \tag{7}$$

The electromotive force $\Delta v1$ induced in the antenna coil of the fixed facility due to the AC magnetic field has an amplitude $\Delta V1$ that is given by the following equation (8)

$$\Delta v1 = \gamma\frac{d\phi 2}{dt} = \Delta V1\cos(\omega 0 t + \pi/2) \tag{8}$$
$$= \Delta V1\sin(\omega 0 t + \pi)$$
$$= -\Delta V1\sin(\omega 0 t)$$

where $\gamma$ denotes a proportional constant.

The equation (8) indicates that the phase of the electromotive force induced in the antenna coil of the fixed facility due to the data carrier is advancing ahead of the phase of the drive voltage of the antenna coil by 180°. The voltage that drives the antenna coil of the fixed facility is the sum of the above drive voltage v1 and the electromotive force given by the equation (8). Strictly speaking, therefore, $\Delta v1$ must be taken into consideration in the equations (2) and (3). In practice, however, the electromotive force $\Delta v1$ is neglected since the drive voltage v1 is very greater than $\Delta v1$.

Considered below is a relationship between the above-mentioned first fixed facility and the neighboring second fixed facility. In the above-mentioned data carrier system, the frequencies and phases of AC voltages that serve as reference are in agreement among the neighboring fixed facilities and, hence, a noise AC magnetic field $\phi n$ from the second fixed facility affecting the first fixed facility is given by the following equation (9) like the equation (4)

$$\phi n = \Phi n \sin(\omega 0 t) \tag{9}$$

where $\phi n$ denotes the amplitude of the noise AC magnetic field.

The electromotive force vn of noise induced in the antenna coil of the first fixed facility is obtained by differentiating the equation (9) as given by the equation (10).

$$vn = \delta\frac{d\phi n}{dt} = Vn\cos(\omega 0 t) \tag{10}$$
$$= Vn\sin(\omega 0 t + \pi/2)$$

where Vn denotes the amplitude of a noise electromotive force, and δ denotes a proportional constant.

As will be obvious from the equation (10), the phase of the noise electromotive force induced by the neighboring fixed facility is advanced ahead of the phase of the drive voltage v1 by 90°. As described above, to the antenna coil of the fixed facility are applied, in series, the drive voltage v1, the electromotive force Δv1 induced by the data carrier and the noise electromotive force vn caused by a neighboring fixed facility. From the equations (1), (8) and (10), therefore, the total drive voltage v of the antenna coil is given by the equation (11)

$$v = V1\sin(\omega 0t) - \Delta V1\sin(\omega 0t) + Vn\sin(\omega 0t + \pi/2) \quad (11)$$

Moreover, a current i that flows through the antenna coil is given by the following equation (12)

$$i = \frac{v}{R1} = \frac{V1}{R1}\sin(\omega 0t) - \frac{\Delta V1}{R1}\sin(\omega 0t) + \frac{Vn}{R1}\sin(\omega 0t + \pi/2) \quad (12)$$

As will be obvious from the equations (11) and (12), the phases of the first term and the second term are the same as the phase of the drive voltage v1 in the case of either the current i or the voltage v. Therefore, the rectifying yield of 100% can be accomplished by the synchronized rectification using a signal having the same phase as the drive voltage as a synchronizing signal. On the other hand, the yield of the third term is 0% and the effect of noise is eliminated.

The present inventors have given attention to the above-mentioned fact, have studied means for realizing this fact, and have arrived at the present invention. The fundamental technical constitution of the invention is as described earlier. That is, according to the present invention, the signal components sent back from the data carrier only are detected and picked up by discriminating the signals induced by AC magnetic fields from the neighboring fixed facilities out of the current that flows into the receiving antenna of the fixed facility. As a means to accomplish this, the frequencies of AC magnetic fields generated by a plurality of fixed facilities arranged neighboring each other, are brought into synchronization with each other, and also, the phases thereof are brought into synchronization with each other.

In other words, in the aforementioned system constitution, the electromotive force induced on the antenna coil of the fixed facility by the AC magnetic field generated from the data carrier has a phase which is advanced by a predetermined angle θ ahead of the AC voltage output from the AC signal generating circuit. On the other hand, the electromotive force induced in the antenna coil by the AC magnetic field generated from a neighboring fixed facility has a phase which is advanced by 90° as will be described later. This relationship of phase holds at all times since the AC signal generating circuits in the fixed facilities are controlled by the synchronizing means. The currents flowing through the antenna coil, due to the above two electromotive forces, contain components that corresponds to the two AC magnetic fields generated from different sources, and their phases are advancing by θ and 90°, respectively, ahead of the AC voltage. Therefore, if the output voltage of the AC signal generating circuit is used as a synchronizing signal and if a current flowing through the antenna coil is detected in synchronism, the signal from the data carrier which is a voltage having a phase advancing by θ is rectified maintaining an yield of cos θ and the noise induced from the neighboring fixed facility which is a voltage having a phase advancing by 90° is rectified maintaining a yield of 0. As a result, the noise component is cancelled, no interference takes place relative to the neighboring fixed facilities, and the signals from the data carrier are correctly detected.

More concretely speaking, in the data carrier system according to an embodiment of the present invention, the fixed facility generates an AC magnetic field from the antenna coil, feeds the electric power and data in the form of the AC magnetic field to the data carrier, detects a change in the AC magnetic field generated by the data carrier through the antenna coil, and receives data transmitted from the data carrier, wherein the fixed facility has at least an AC signal generating circuit, a signal modulating circuit, an antenna driving circuit, the antenna coil, and a synchronous detecting means which is brought into synchronism with an AV voltage output from said AC signal generating circuit, and wherein the AC voltage output from the AC signal generating circuit is modulated through the modulating circuit to superpose the data, the modulated AC voltage is amplified through the antenna drive circuit, the amplified electric power is fed to the antenna coil to generate an AC magnetic field, the current flowing through the antenna coil is rectified and detected by the synchronous detecting means in order to demodulate the data from the data carrier received by the antenna coil, and the frequency and phase of the AC voltage output by the AC signal generating circuit are controlled by a suitable control means. In the aforementioned constitution of the present invention, it is necessary to synchronize the frequencies or the frequencies and phases of AC signals generated from a plurality of fixed facilities arranged near each other. For this purpose, provision is made of the control means.

It is desired that the above control means is a common signal-forming means which forms the same AC signals that are sources for generating AC magnetic fields from the fixed facilities. For instance, the common signal-forming means may be constituted by at least one AC signal generating means and signal input means provided in each of the fixed facilities to receive AC signals from the AC signal generating means, or may be constituted by the AC signal generating means which is provided in one fixed facility, so that the same AC signals are fed from the above fixed facility having the AC signal generating means to the signal input means provided in other fixed facilities. That is, in the present invention, each of the fixed facilities may have the input means only and the AC signals may be fed in series or in parallel to each of the fixed facilities from the AC signal generating means which is provided outside the fixed facilities, or the AC signal generating means may be provided in any one of the plurality of fixed facilities and the AC signals may be fed from the AC signal generating means of the above fixed facility to the input means of other fixed facilities, in order to synchronize the frequencies and phases of AC signals generated by the AC signal generating means possessed by each of the plurality of fixed facilities that are arranged near each other.

According to another embodiment, the AC signal generating means and the signal input means may be provided in each of the plurality of fixed facilities, and the AC signal generating means in each fixed facility may be controlled by a suitable synchronizing means.

In the present invention, furthermore, the fixed facility may have an AC signal generating means such as a clock for the internal circuit and a switching means for switching the signals from the signal input means. Moreover, the signal input means provided in each of the fixed facilities should desirably be isolated in a DC manner from the AC signal generating means. It is desired that the selectively detecting means of the present invention is a synchronous detecting circuit that uses synchronizing clocks formed by AC signals which are rendered to be the same by the common signal-forming means. The data carrier according to an embodiment of the invention will now be described in detail with reference to the drawings.

Figure 1:
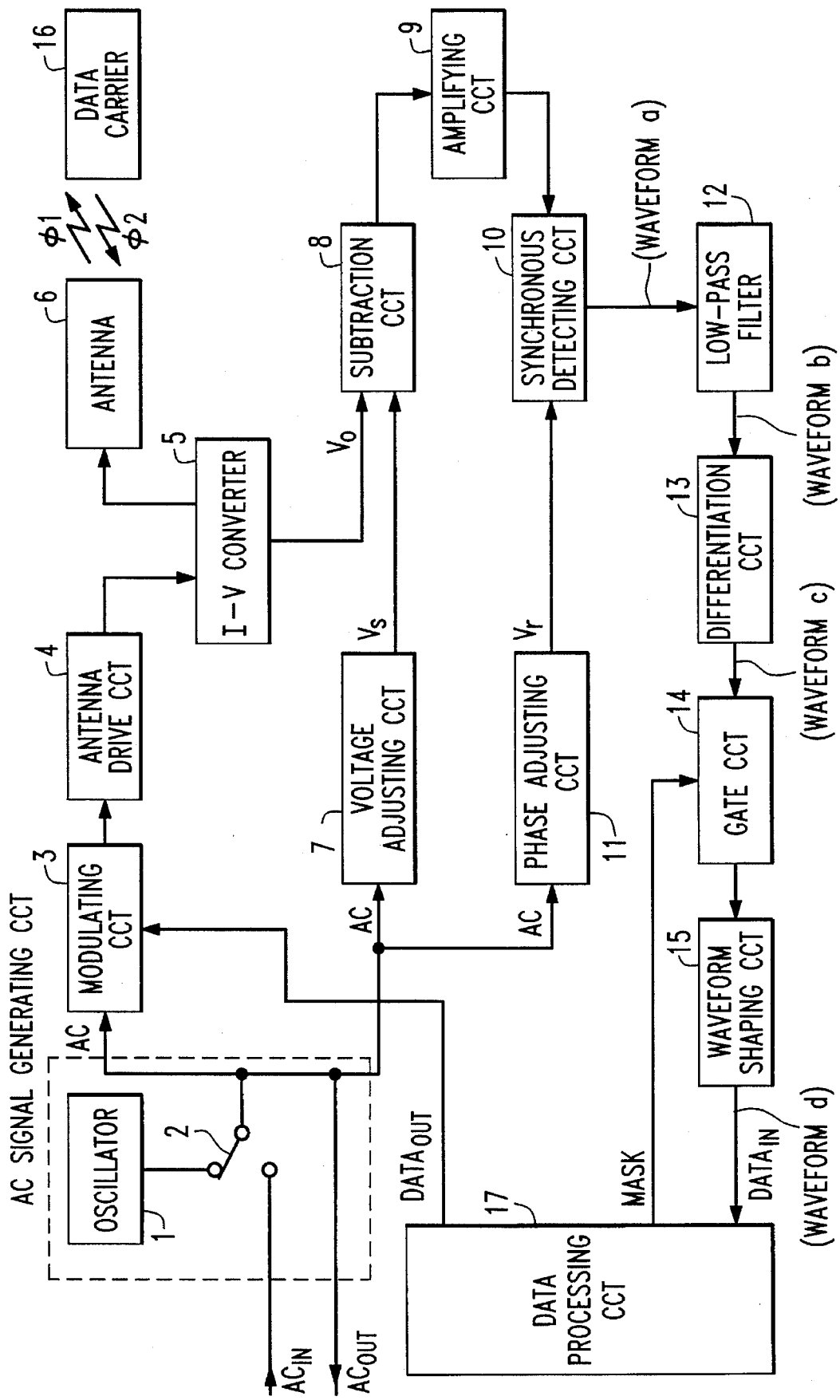
FIG. 1 is a block diagram illustrating an embodiment of the present invention.

FIG. 1 is a block diagram illustrating a fixed facility in the data carrier system according to an embodiment of the present invention, in which the AC signal generating circuit is constituted by an oscillator 1 and a switch 2. Either an output signal of the oscillator 1 or a signal fed to a terminal ACin from an external unit is selected depending on the connection of the switch, and is used as an AC signal for the fixed facility. The AC signal AC is fed from a signal output terminal ACout to a terminal ACin of another neighboring fixed facility. Thus, the above two fixed facilities are allowed to use quite the same AC signal AC. When these two fixed facilities will not be interfered by each other because of, for example, they are distant from each other, they may use an output signal from the oscillator 1 contained in each of them. In this embodiment, the AC signal AC is distributed to a modulating circuit 3, a voltage adjusting circuit 7 and a phase adjusting circuit 11.

The modulating circuit 3 modulates the AC signal AC depending upon an output data DATAout from a data processing circuit 17, i.e., depending upon the data to be sent to the data carrier. The modulation systems include frequency modulation, phase modulation and amplitude modulation, and any one of them may be employed. However, the effects of the present invention can be used most effectively by using a binary amplitude modulation system which will now be described.

An antenna drive circuit 4 amplifies the output signal from the modulating circuit 3 and drives an antenna 6 via a current-voltage converter 5. The antenna 6 is constituted by a series resonance circuit of an antenna coil and a capacitor, and the resonance frequency is in agreement with the frequency of the above AC signal AC. As described above, an AC magnetic field $\phi 1$ is produced from the antenna 6, and an AC magnetic field $\phi 2$ is returned back from a data carrier 16 that has received the energy thereof. The current of the antenna 6 is converted into a voltage by the current-voltage converter 5 and is used as a first input voltage Vo to a subtraction circuit 8. The first input voltage Vo is obtained by multiplying the equation (11) or (12) by a coefficient, and is expressed as follows:

$$Vo = kV1\sin(\omega 0T) - k\Delta V1\sin(\omega 0t) + kVn\sin(\omega 0t - \pi/2) \quad (13)$$

A second input voltage to the subtraction circuit 8 is an AC voltage Vs that is obtained by adjusting the voltage of the AC signal AC through the voltage adjusting circuit 7. If the voltage adjusting circuit 7 is so adjusted that the AC voltage Vs becomes equal to the first term of the equation (13), then the output voltage of the subtraction circuit 8 of when the data is not transmitted from the fixed facility is expressed by the second term and third term only of the equation (13). That is, no voltage is included that corresponds to the current that is directly driven by the antenna drive circuit 4. Therefore, the voltage amplitude is small and can be amplified by an amplifying circuit 9. The output voltage of the amplifying circuit 9 is guided to a synchronous detecting circuit 10 which uses the output voltage Vr of the phase adjusting circuit 11 as a synchronizing signal, and is rectified and is detected. At this moment, though the yield of the third term of the equation (13) is 0% in principle, the phase may often be deviated due to error factor of a circuit such as the amplifier 9. In order that the yield of the noise term becomes 0% by compensating the phase deviation, the phase adjusting circuit 11 is adjusted to change the phase of the synchronizing signal. Thus, the output signal of the synchronous detecting circuit 10 includes a component induced by the data carrier only.

If it is now presumed that there is no subtraction circuit 8 and the output voltage of the current-voltage converter 5 is directly input to the amplifying circuit 9, then the output of the amplifying circuit is readily saturated and it is not allowed to increase the degree of amplification. Not only this, even a slight deviation in the phase of the synchronizing signal in the synchronous detection causes the yield of the first term in the equation (13) to change greatly, and a relatively large error is generated. Therefore, the voltage adjusting circuit 7 and the subtraction circuit 8 play very important roles from the standpoint of demodulating the data transmitted from the data carrier and maintaining improved reliability.

Figure 4A:
FIGS. 4(A–D) is a diagram of waveforms explaining the embodiment of FIG. 1.
Figure 4B:

The detected output of the synchronous detecting circuit 10 has a waveform as shown in FIG. 4(A) from which, however, the carrier wave component is removed through a low-pass filter 12, and the resultant waveform consists of a low-frequency component and a rectangular wave as shown in FIG. 4(B). In this step, the data related to the distance between the data carrier and the fixed facility is superposed on the signal. Concretely speaking, the data related to the distance is a magnitude of the electromotive force $\Delta vl$, and a DC voltage of a magnitude proportional thereto is superposed. The superposed DC voltage changes depending upon a change in the distance between the data carrier and the fixed facility, and causes the input operation point of the waveform-shaping comparator circuit to change.

Figure 4C:

In order to remove the superposed DC voltage according to this embodiment, the output signal of the low-pass filter 12 is differentiated by a differentiation circuit 13. This makes it possible to remove a signal of a low frequency due to a relatively slow change such as of the data carrier that is approaching or is moving away from the fixed facility. However, a sudden change such as a bit change in the digital data sent from the data carrier is transmitted without deterioration as represented by a differentiated waveform shown in FIG. 4(C).

Figure 4D:

The differentiated waveform is transmitted to a waveform shaping circuit 15 via a gate circuit 14 which is controlled by a gate control signal MASK output from a data processing circuit 17 and which does not permit the signal to pass through when the fixed facility is transmitting data, i.e., when the data processing circuit 17 is sending the output data DATAout. Therefore, the signals input to the waveform shaping circuit 15 are only those that are sent from the data carrier. The waveform shaping circuit 15 raises the signal upon receipt of a plus pulse of the differentiated waveform and breaks the signal upon receipt of a minus pulse, thereby to generate data signals of a rectangular waveform as shown in FIG. 4(D). The data signals are sent to the data processing circuit 17 as input data DATAin.

Figure 5:
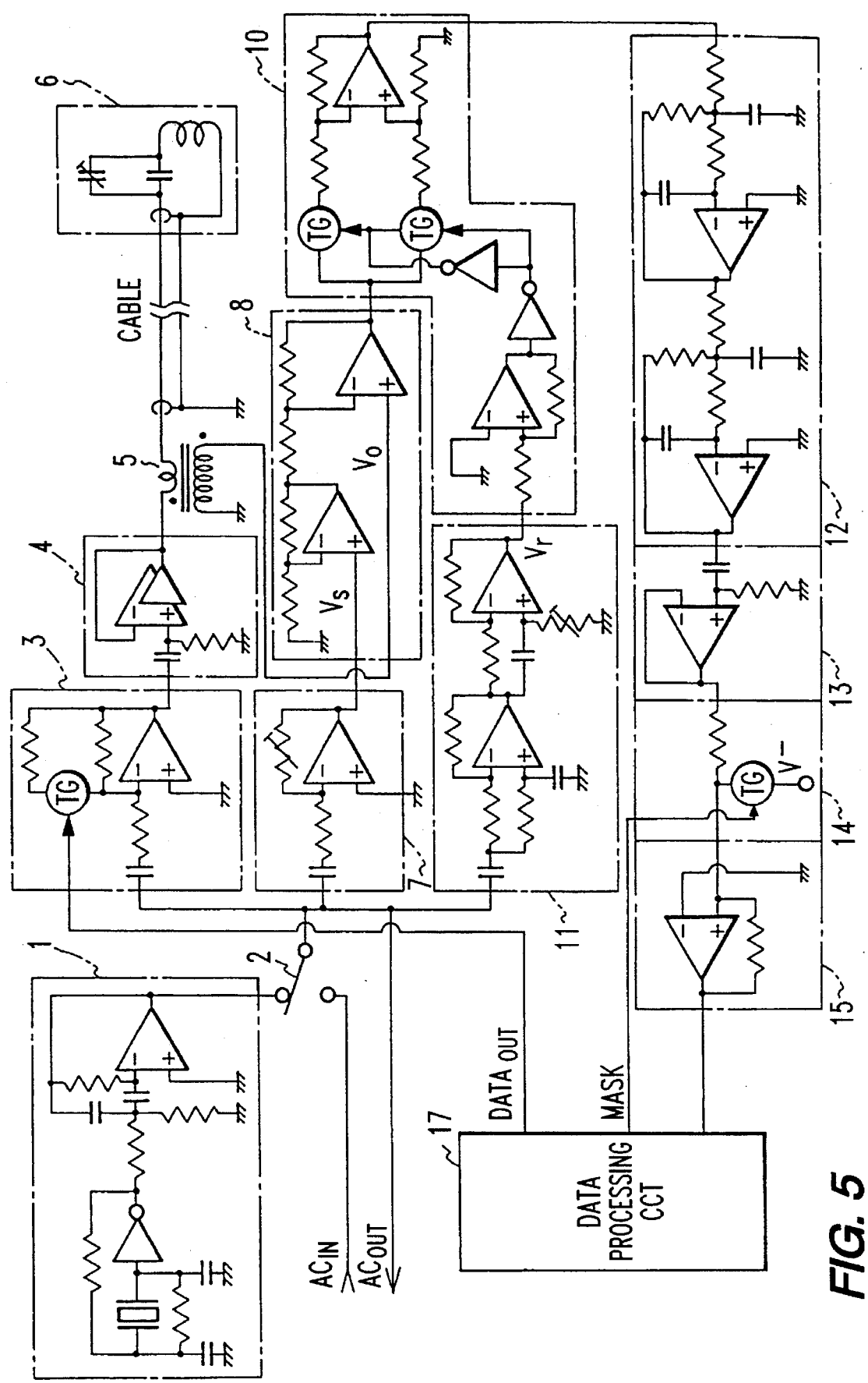
FIG. 5 is a circuit diagram illustrating the first embodiment of the present invention.

FIG. 5 is a circuit diagram which concretely illustrates the embodiment of FIG. 1. The oscillation circuit 1 is constituted by a quartz oscillator using C-MOS inverter as an amplifier and a band-pass filter, and is capable of generating very coherent AC signals by removing distorted waves contained in the oscillation output of the quartz oscillator using a band-pass filter.

The modulating circuit 3 is realized by an inverting amplifier using an operational amplifier. The feedback resistor is partly turned on and off by a transmission gate to change the degree of amplification and, hence, to modulate the amplitude of AC signals in two steps. At this moment, the signal that controls the transmission gate is the output data DATAout.

The antenna drive circuit 4 is constituted by a voltage follower circuit of a power operational amplifier.

The current-voltage converter circuit 5 is realized by a transformer. The transformer must have a primary winding whose number of turns are not so large so as not to interrupt the supply of electric power to the antenna 6.

The antenna 6 is installed at a place remote from the main body of the fixed facility by using a coaxial cable, and is constituted by a series resonance circuit of an antenna coil and a capacitor. The capacitor includes a fixed capacitor and a variable capacitor connected in parallel, and the resonance condition is adjusted by the variable capacitor.

The voltage adjusting circuit is constituted by an inverting amplifier circuit of the operational amplifier and includes a feedback resistance which is adjustable such that the amplitude of the output voltage thereof can be changed.

The subtraction circuit 8 is a high input-impedance differential amplifier constituted by using two operational amplifiers. The differential amplifier has a function of subtraction and works as an amplifying circuit 9 as well.

The synchronous detecting circuit 10 is constituted by an operational amplifying circuit which saturation-amplifies a synchronizing signal Vr to generate a synchronizing signal with a rectangular waveform, two C-MOS inverters which convert the above synchronizing signal into two gate control signals having a complementary relationship and a good rising characteristic, two transmission gates that are turned on an off by the gate control signal, and a differential amplifier made of an operational amplifier. In order for the output signal of the synchronous detecting circuit to have a full-wave rectified waveform as shown in FIG. 4(A), the phases of the two gate control signals must be in agreement with the phase of an input signal to the synchronous detecting circuit 10. For this purpose, a means is necessary for adjusting the phase of the synchronizing signal Vr.

The phase adjusting circuit 11 is constituted by two phase shifting circuits made up of operational amplifiers. The first phase shifting circuit delays the phase of the AC signal AC by $\theta$ ($\theta<90°$) and the phase shifting circuit in the latter stage advances the once delayed signal by $\theta$, so that the phase is not shifted as a whole. By varying the constant of the phase shifting circuit in the latter stage, however, the shifting amount can be adjusted to either the plus direction or the minus direction near 0°.

The low-pass filter 12 is constituted by directly coupling in two stages the double feedback-type active low-pass filters that use operational amplifiers, and the differentiation circuit 13 is constituted by a differentiation circuit of the capacitor input type and a voltage follower circuit of the operational amplifier.

The gate circuit 14 is constituted by a transmission gate which is turned on and off by a gate control signal MASK output from the data processing circuit 17, and works to cut off the differentiation waveform by directly connecting the output of the differentiation circuit 13 to the negative power source V–.

The waveform shaping circuit 15 is a comparator which uses an operational amplifier.

The output of the circuit 15 can be raised or reduced depending upon a positive pulse and a negative pulse alternatingly output from the differentiation circuit 13. When the data is sent from the fixed facility, the negative power source voltage is input to the comparator through the gate circuit 14, and its output voltage is maintained at a low level. Therefore, reception of the data from the data carrier starts with a low level at all times.

Figure 6:
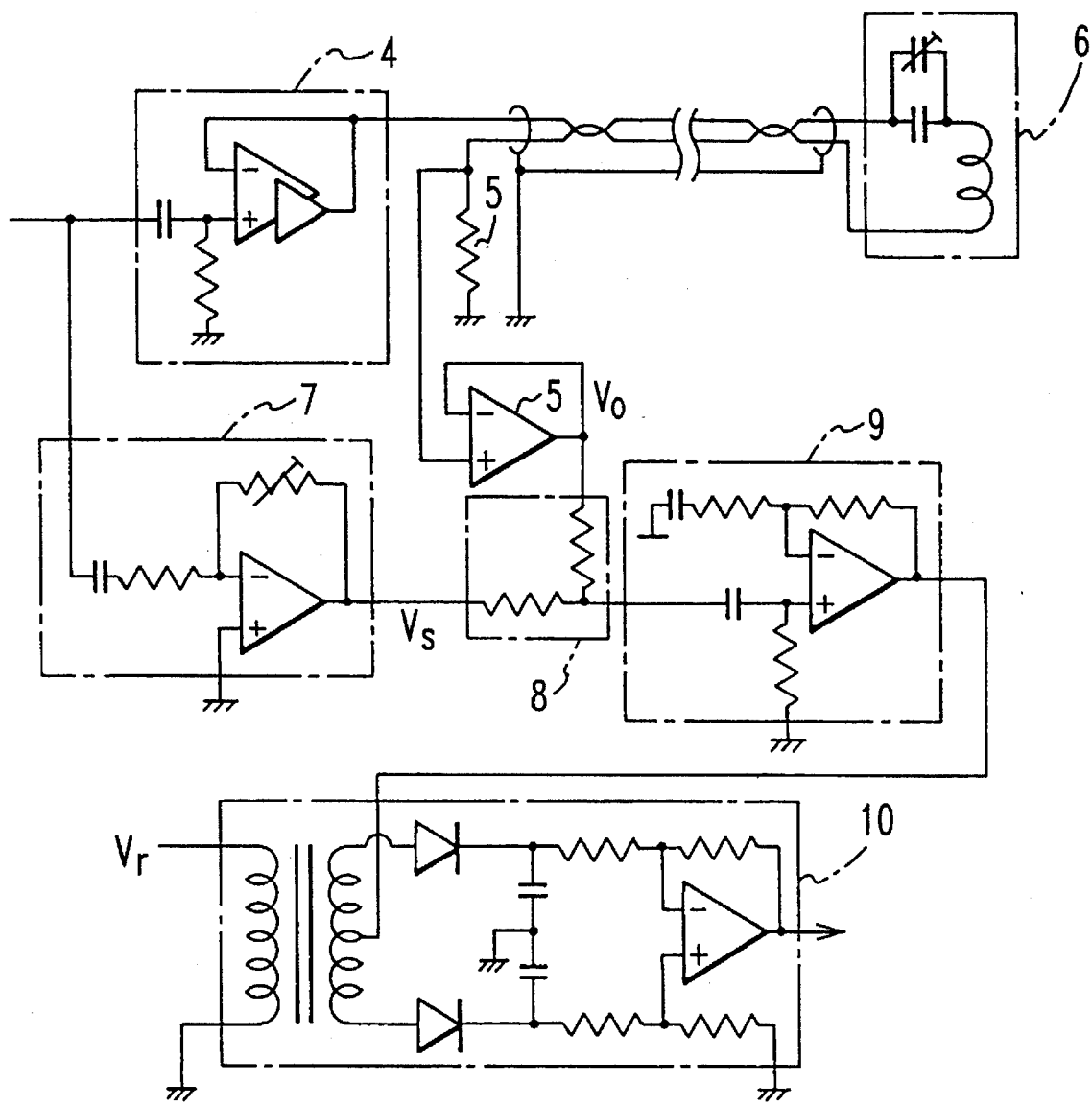
FIG. 6 is a circuit diagram illustrating a second embodiment of the present invention.

The foregoing described in detail an embodiment of the present invention in conjunction with FIG. 5. The present invention can be realized in the form of various other circuits. The circuit diagram of FIG. 6 represents an embodiment of the present invention and illustrates the antenna drive circuit 4, current-voltage converter 5, antenna 6, voltage adjusting circuit 7, subtraction circuit 8, amplifier 9, and synchronous detecting circuit 10 only.

In this embodiment, the current-voltage converter 5 is constituted by a resistor, and a voltage across this resistor is converted into an impedance by the voltage follower circuit of the operational amplifier. The resistor used for this purpose should have a small value so will not to limit the current that flows through the antenna coil. As a result, the output voltage Vo becomes small, and some contrivance is required to enhance the sensitivity such as by replacing the voltage follower circuit by an amplifier having a high input impedance.

The input voltage to the voltage adjusting circuit 7 is the same as the input voltage to the antenna drive circuit 4 and on which the data that is transmitted is superposed. However, no problem arises since the output voltage of the voltage adjusting circuit is used only when the data from the data carrier is received.

The subtraction circuit is very simply constructed in which two resistors are connected in series. Since the two input voltages Vo and Vs have polarities that are inverted (phases are deviated by 180°), the result of subtraction appears at a point where the two resistors are connected together.

The output of the subtraction circuit is amplified through the amplifier 9 having a high input impedance and is fed to the synchronous detecting circuit 10. The synchronous detecting circuit of this embodiment is constituted by a transformer, two rectifying diodes, two filter capacitors, and a differential amplifier made up of an operational amplifier. The synchronizing signal Vr remains in the form of a sinusoidal wave and no circuit is needed for saturation amplification. The synchronous detecting circuit of this type is more generally used than the one that is shown in FIG. 5 but has a defect in that a limitation is imposed on the range of in-phase input voltages to the operational amplifier.

Figure 7:
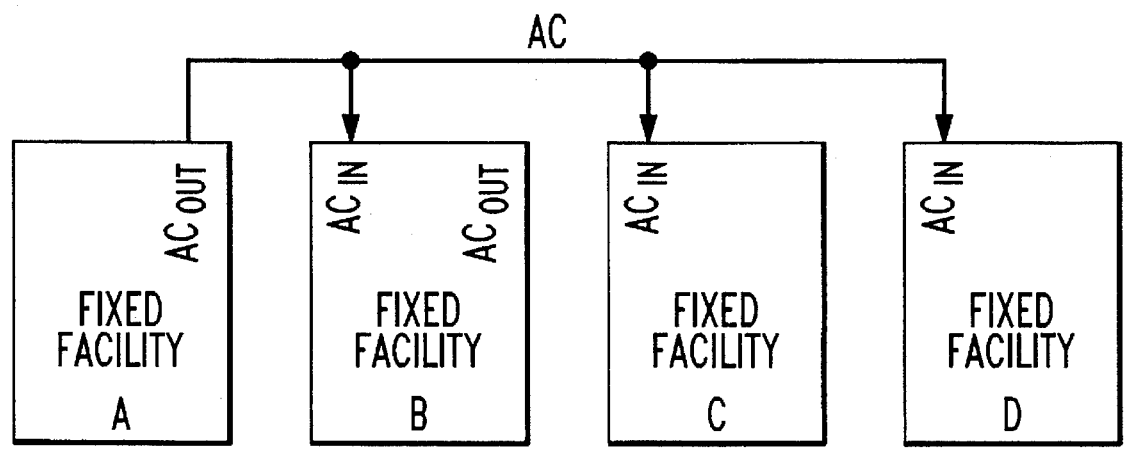
FIG. 7 is a block diagram illustrating a method of connecting a plurality of fixed facilities in the data carrier system of the present invention.
Figure 8:
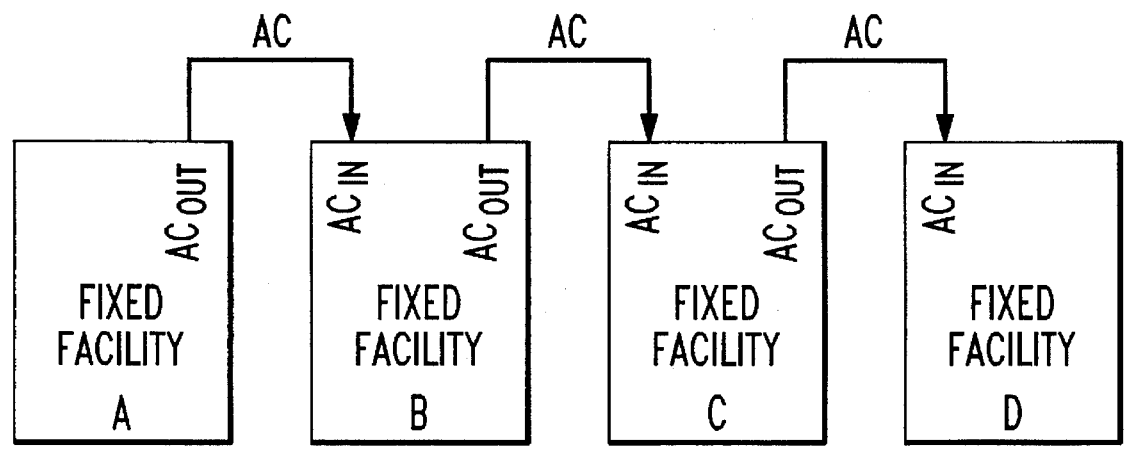
FIG. 8 is a block diagram illustrating another method of connecting a plurality of fixed facilities in the data carrier system of the present invention.

The foregoing described an embodiment of the fixed facility. The data carrier system of the present invention exhibits its feature when a plurality of fixed facilities are arranged close to each other. FIGS. 7 and 8 are diagrams explaining the methods of installing a plurality of fixed facilities, wherein each fixed facility has an AC signal generating circuit which is constituted like in the embodiment of FIG. 1.

FIG. 7 illustrates a method in which the output signal of the oscillator contained in the fixed facility A is taken out from the terminal ACout and is distributed to the terminals ACin of other fixed facilities B, C and D. In the connection method of this type, the oscillator contained in the fixed facility A must have a large output margin, but the synchronizing precision can be enhanced among the fixed facilities. FIG. 8 illustrates a method of connection of one after another, in which the output signal of the oscillator contained in the fixed facility A is taken out from the terminal ACout and is distributed to the terminal ACin of the fixed facility B, and the terminal ACout of the fixed facility B is connected to the terminal ACin of the fixed facility C. According to this method, each fixed facility is equipped with a relay amplifier, so that very many fixed facilities can be used in series accompanied, however, by a defect in that deviations of phases through the relay amplifiers may accumulate.

In the aforementioned embodiment, the data carrier that is used was the electromagnetically coupled data carrier of the resonance condition control type. The present invention, however, is in no way limited to this condition only.

In the aforementioned embodiment, the antenna of the fixed facility was constituted by an antenna coil and a resonance capacitor. It is, however, also allowable to constitute the antenna by using two antenna coils for transmission and reception and a resonance capacitor. In this case, the two antenna coils are never permitted to be free from the magnetically coupled state and can equivalently be regarded to be a single coil or a current-voltage converter which pertains to the scope of the invention.

Next, concretely described below is the control means which includes the function of the subtraction circuit and the common signal-forming means used in the present invention.

FIG. 9 is a diagram of waveforms explaining the operation of the subtraction circuit 8, wherein the diagram (A) shows received signals Vo output from the current-voltage converter circuit 5, the diagram (B) shows reference signals Vs output from the voltage adjusting circuit 7, and the diagram (C) shows differential signals Vc output from the subtraction circuit 8. The waveform of the diagram (A) contains a change in the voltage amplitude caused by a change in the AC magnetic field $\phi$ generated by the data transmitted from the data carrier 16. The subtraction circuit 8 subtracts the waveform of (A) from the waveform of (B) to obtain a differential signal Vc shown in the diagram (C) which is a signal component in the data transmitted from the data carrier 16.

The aforementioned embodiment uses the subtraction circuit 8 as a means for detecting the data transmitted from the data carrier 16 in order to detect only a change in the AC magnetic field when the data are transmitted. A change in the output of the subtraction circuit 8 is a very small signal. In order for this very small signal to be recognized as the received data, therefore, the difference signal must be amplified to a sufficient degree by the amplifying circuit 9.

Under the condition where no data is transmitted from the data carrier 16, the voltage amplitude of the AC signal AC is adjusted by the voltage adjusting circuit 7 such that the amplitudes will be in agreement between the received signal Vo and the reference signal Vs. Therefore, the difference signal Vc has a very small amplitude under the condition where no data is transmitted from the data carrier 16. Therefore, the amplification factor is set by taking into consideration whether a change in the amplitude of the difference signal Vc can be detected when the data are transmitted from the data carrier 16.

FIG. 10(A) shows differential signal Vc output from the subtraction circuit 8 when the voltage adjusting circuit 7 is adjusted to an optimum condition, and FIG. 10(B) shows the amplified signal Va obtained by amplifying the difference signal Vc. In this case, the amplified signal Va is zero when no modulation is effected from the data carrier 16, and the components in the data signals are only amplified and output as signals when the modulation is effected from the data carrier 16.

When the data carrier system is used for extended periods of time, however, the circuit and antenna characteristics undergo a change due to the lapse of time and a change in the surrounding environment, and the amplitude may deviate between the received signal Vo and the reference signal Vs though they had been adjusted to be in agreement under the initial condition. As for the phase, furthermore, though the received signal Vo and the reference signal Vs are made up of a common AC signal AC, their phases are not necessarily in agreement with each other due to a delay involved in the circuit. Deviation in the phase may further take place due to a change in the circuit and antenna characteristics caused by the passage of time and change in the surrounding environment like amplitude deviation.

When the amplitude or phase are not synchronized between the received signal Vo and the reference signal Vs, the amplitude of the difference signal Vc output from the subtraction circuit 8 becomes larger even when no data is transmitted from the data carrier 16. When the difference signal Vc under such a condition is amplified by the amplifying circuit 9 which has been adjusted to exhibit a sufficiently large amplification factor to meet a very small signal from the data carrier 16, the signal is saturated and the data transmitted from the data carrier 16 cannot be correctly detected. This means that the S/N ratio of the receiving circuit is deteriorated. According to this method, therefore, the necessary condition is that the amplitudes and phases are in agreement between the received signal Vo and the reference signal Vs under the steady state.

FIG. 11(A) shows the waveform of the difference signal Vc of when the output of the subtraction circuit 8 becomes larger due to a out of mis-adjustment of the voltage adjusting circuit 7 or a change in the circuit and antenna characteristics when no data is transmitted from the data carrier 16. In this case, if the difference signal Vc is amplified through the amplifying circuit 9 maintaining the same amplification factor as that when the signal is amplified from the wave of FIG. 10(A) to the wave of FIG. 10(B), the amplified signal Va from the amplifying circuit 9 is saturated as shown in FIG. 11(B), and the data transmitted from the data carrier 16 cannot be recognized.

In order to prevent the output of the amplifier circuit 9 from being saturated, the amplification factor of the amplifying circuit 9 must be suppressed when the circuit and antenna characteristics undergo a change after a lapse of time and due to a change in the surrounding environment, and the amplitude or phase undergoes a deviation to some extent between the received signal Vo and the reference signal Vs even though they had been adjusted to be in agreement under the initial conditions. When the amplification factor is suppressed to a degree that the amplified signal Va is not saturated, it becomes difficult to detect the signal when the data signal from the data carrier 16 is very small. This means that the possible receiving distance between the data carrier 16 and the fixed facility is reduced.

One of the methods for solving the above-mentioned problem is to provide an AC signal adjusting circuit that forms a reference signal Vs from the AC signal AC and an amplitude difference detecting circuit which detects an amplitude difference between the received signal Vo and the reference signal Vs and outputs an amplitude difference data, instead of using the above-mentioned voltage adjusting circuit 7, the AC signal adjusting circuit being controlled by the amplitude difference data such that the amplitude is in agreement between the received signal Vo and the reference signal Vs.

According to a preferred embodiment, provision is made of a phase difference detecting circuit which detects a phase difference between the received signal Vo and the reference signal Vs and outputs a phase difference data, the AC signal adjusting circuit being provided with a phase adjusting function, and the phase between the received signal and the reference signal being brought into agreement by the phase difference data.

In in further detail, the data carrier system of the invention comprises an electromagnetically coupled data carrier that effects two-way communication and a fixed facility, wherein said fixed facility comprises at least an AC signal generating means that generates AC signals, an antenna that transmits said AC signals as Ac magnetic fields, a received signal detecting means which detects as a received signal a change in the antenna current generated by said data carrier that changes the AC magnetic field transmitted from said antenna, an AC signal adjusting circuit that adjusts the amplitude of said AC signal to output a reference signal, and an amplitude difference detecting circuit that detects a difference in the amplitude between the received signal and the reference signal and outputs an amplitude difference data, and wherein said AC signal adjusting circuit is operated by the amplitude difference data such that the amplitudes of the received signal and the reference signal are brought into agreement.

Provision is further made of a phase difference detecting circuit that detects a phase difference between the received signal and the reference signal and outputs phase adjusting data, and the AC signal adjusting circuit is provided with a phase adjusting function, and the phase adjusting circuit operates upon receipt of the phase adjusting data to bring the phase, of the received signal and the reference signal into agreement.

Figure 12:
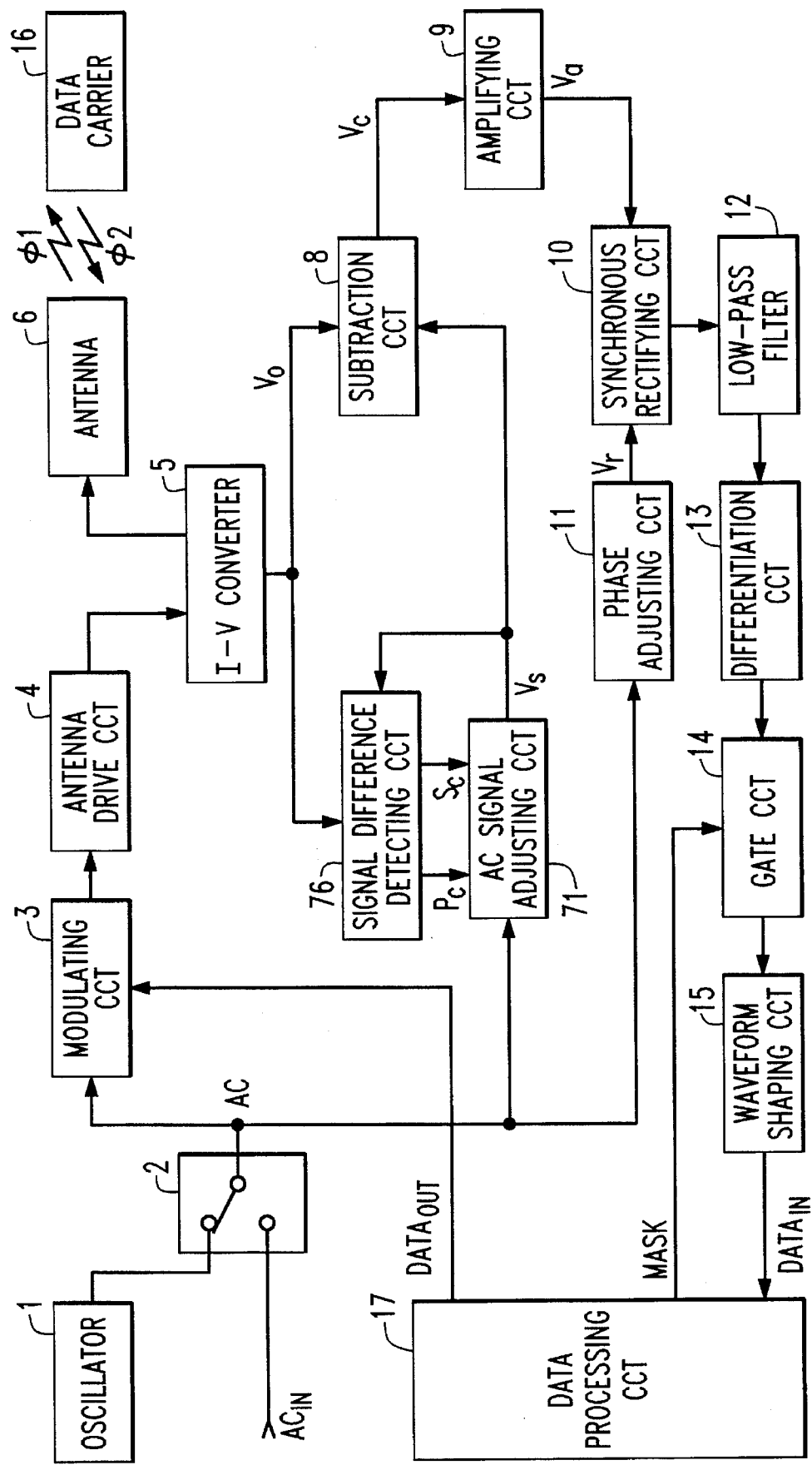
FIG. 12 is a block diagram illustrating a circuit constitution of the data carrier system according to another embodiment of the present invention.

The above constitution will now be described with reference to the drawings. FIG. 12 is a block diagram of a circuit constitution of the fixed facility for explaining the above constitution according to an embodiment of the invention. This embodiment improves part of the circuit constitution of the fundamental embodiment of the invention shown in FIG. 1 and in which the same elements as those of FIG. 1 are denoted by the same reference numerals and their description is not repeated. In FIG. 12, reference numeral 71 denotes an AC signal adjusting circuit which corresponds to the voltage adjusting circuit 7 of FIG. 1, and 76 denotes a signal difference detecting circuit which compares the two inputs, i.e., compares the received signal Vo and the reference signal Vs, and outputs a phase difference data Pc and an amplitude difference data Sc. The AC signal adjusting circuit 71 adjusts the AC signal AC relying upon the phase difference data Pc and the amplitude difference data Sc, in order to bring the phase and amplitude or the received signal Vo and the reference signal Vs into agreement.

Figure 13:
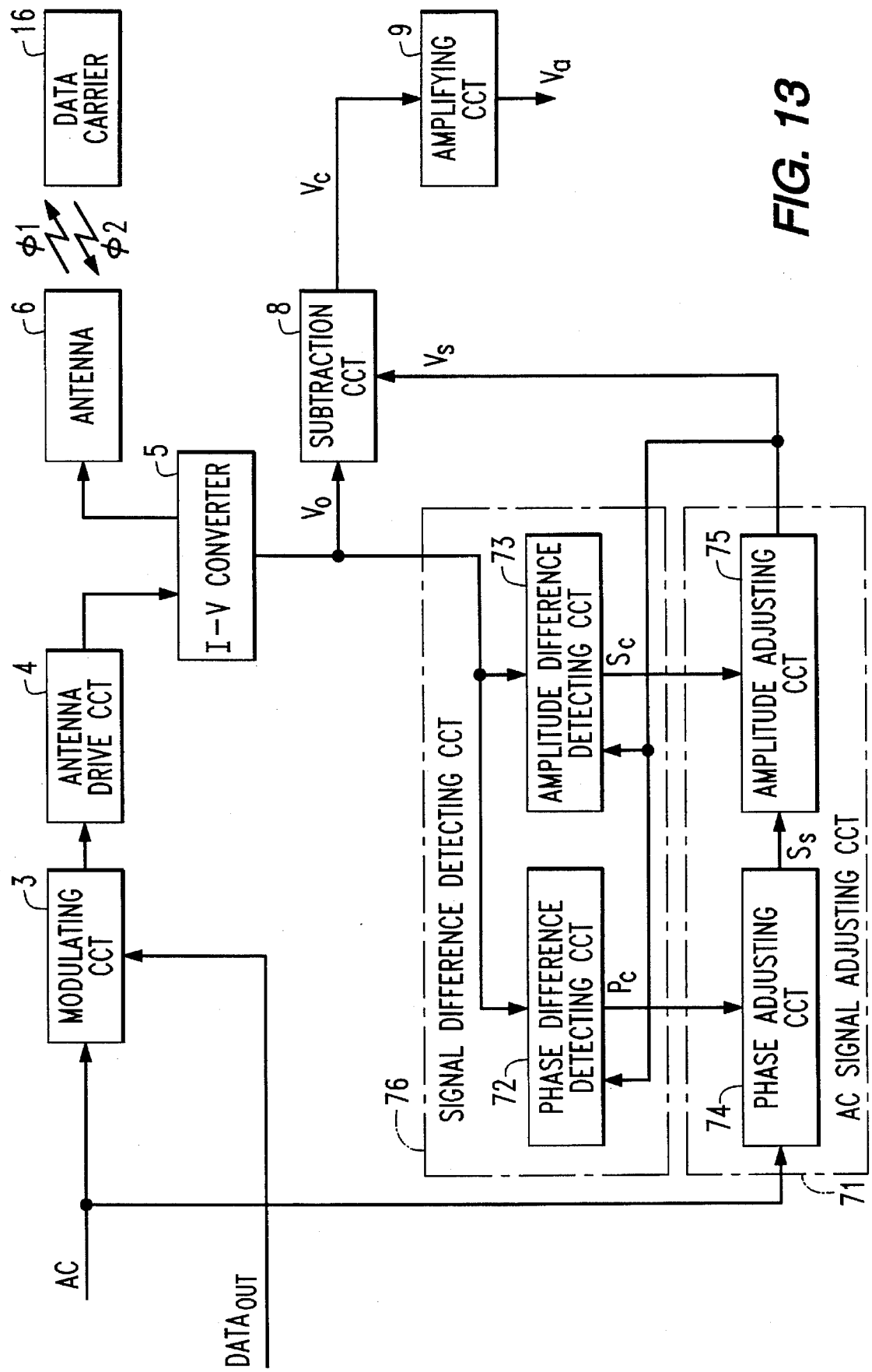
FIG. 13 is a block diagram illustrating in further detail the circuit constitution of the data carrier system that is shown in FIG. 12.

FIG. 13 is a block diagram illustrating in further detail major portions of the fixed facility of the embodiment and wherein reference numeral 72 denotes a phase difference detecting circuit and 73 denotes an amplitude difference detecting circuit which constitutes the signal difference detecting circuit 76. Reference numeral 74 denotes a phase adjusting circuit and 75 denotes an amplitude adjusting circuit which constitutes the AC signal adjusting circuit 71. The phase difference detecting circuit 72 detects a phase difference between the received signal Vo input to the subtraction circuit 8 and the reference signal Vs, and outputs a phase difference data Pc depending upon the amount of phase difference that is detected. The phase adjusting circuit 74 adjusts the phase of the AC signal AC depending on the phase difference data Pc, and outputs a phase-synchronizing signal Ss that works to bring the phases into agreement between the received signal Vo and the reference signal Vs.

The amplitude difference detecting circuit 73 detects an amplitude difference between the received signal Vo input to the subtraction circuit 8 and the reference signal Vs, and outputs an amplitude difference data Sc depending upon the amount of the amplitude difference that is detected. The amplitude adjusting circuit 75 adjusts the amplitude of the phase-homologizing signal Ss depending on the amplitude difference data Sc, and brings the amplitudes into agreement between the received signal Vo and the reference signal Vs thereby to output the reference signal Vs having phase and amplitude in agreement with those of the received signal Vo.

The above-mentioned system constitutes a feedback loop that detects and corrects the difference in phase and the difference in amplitude between the received signal Vo and the reference signal Vs. It is necessary that the reaction time of the feedback loop is sufficiently longer than the transmission speed of data from the data carrier 16, i.e., it is necessary that the time from when a deviation in phase between the received signal Vo and the reference signal Vs is detected by the phase difference detecting circuit 72 until when the phase adjusting data Pc is sent to the phase adjusting circuit 74 to correct the phases of the received signal Vo and the reference signal Vs, as well as the time from when a deviation in amplitude between the received signal Vo and the reference signal Vs is detected by the amplitude difference detecting circuit 73 until when the amplitude difference data Sc is sent to the amplitude adjusting circuit 75 to correct the amplitudes of the received signal Vo and the reference signal Vs, are sufficiently longer than the transmission speed of data from the data carrier 16. This is because, when the reaction time of the feedback loop is too short, correction of phase and amplitude follows the change in the difference output Vc of the subtraction circuit 8 caused by a change in the received signal Vo upon receipt of data from the data carrier 16, and the difference output Vc of the subtraction circuit 8 becomes zero, making it difficult to detect the data transmitted from the data carrier 16.

Moreover, a change in the circuit characteristics caused by a change in the ambient temperature and the lapse of time that affects the circuit and antenna of the fixed facility, does not usually appear quickly. Therefore, the role of the compensation circuit is played sufficiently even when the reaction time of the feedback loop is lengthened.

The above-mentioned system necessarily brings the phases and amplitudes into agreement between the received signal Vo and the reference signal Vs. This makes it possible to increase the amplification factor of the amplifying circuit 9, to sufficiently detect even very small data signals from the data carrier 16, and to increase the possible communication distance between the data carrier 16 and the fixed facilities. Moreover, the above-mentioned system has a function for setting the difference of amplitude to zero between the received signal Vo and the reference signal Vs that had to be done in the embodiment of FIG. 1, and obviates the need for initial adjustment.

Figure 14:
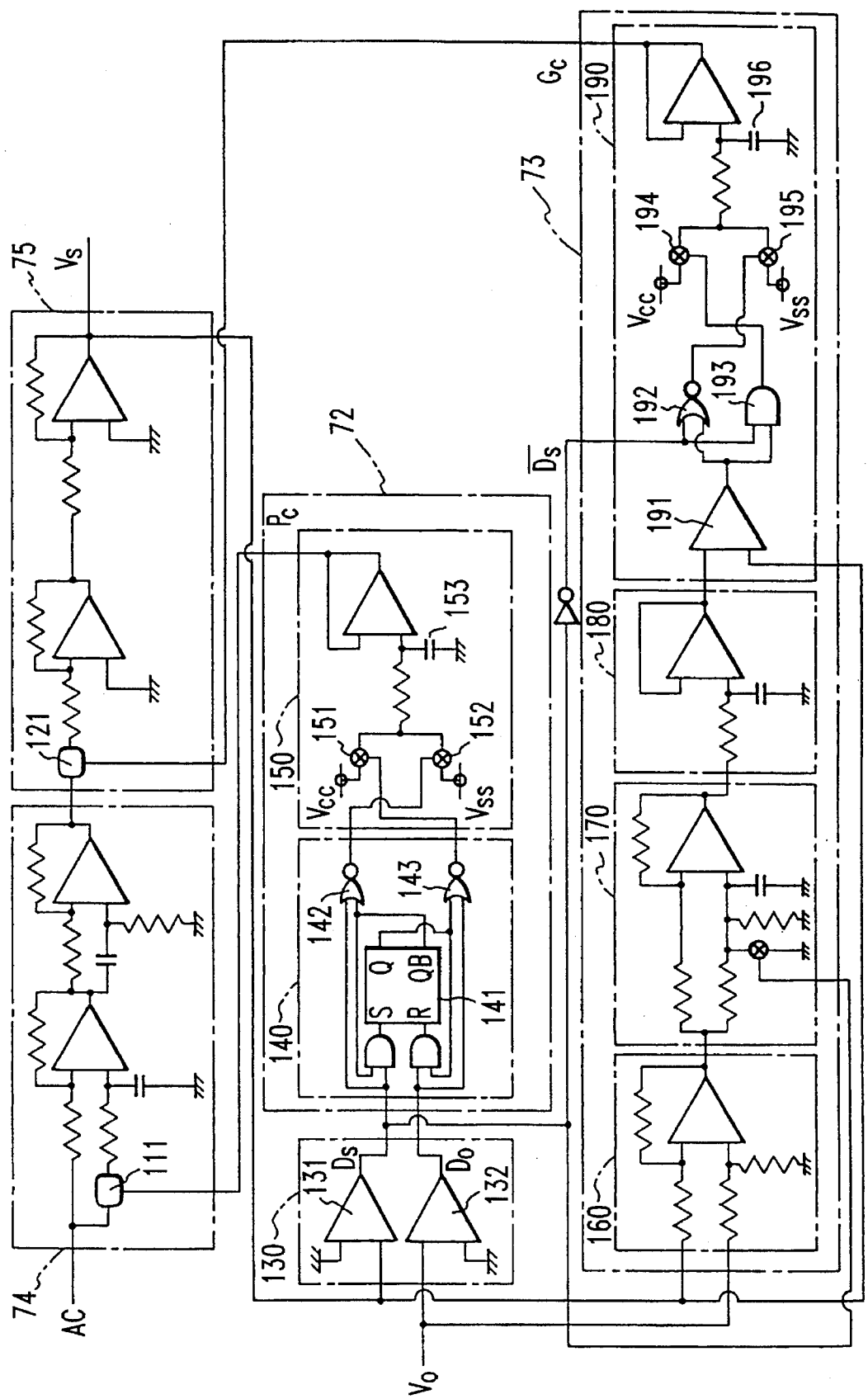
FIG. 14 is a circuit diagram illustrating the constitution of a phase difference detecting circuit and an AC signal adjusting circuit in the data carrier system shown in FIGS. 12 and 13 of the present invention.

FIG. 14 is a circuit diagram illustrating in detail the constitution of the signal difference detecting circuit 76 and the AC signal adjusting circuit 71 in the embodiment of FIG. 13. In FIG. 14, reference numeral 74 denotes the phase adjusting circuit, 111 denotes a variable resistor, 75 denotes the amplitude adjusting circuit, 121 denotes a variable resistor, 130 denotes a waveform shaping circuit, 131 a comparator, 132 a comparator, 72 denotes the phase difference detecting circuit, 140 a phase deviation detecting circuit, 141 an RS flip-flop, 142 and 143 denote NOR gates, 150 a phase difference-voltage converter circuit, 151 and 152 denote analog switches, 153 a capacitor, 73 the amplitude difference detecting circuit, 160 a difference detecting circuit, 170 a synchronizing signal detecting circuit, 180 a low-pass filter, 190 a DC Converter circuit, 191 a comparator, 192 a NOR gate, 193 an AND agate, 194 an analog switch, 195 an analog switch, and 196 denotes a capacitor.

In the waveform shaping circuit 130, the reference signal Vs and the received signal Vo are converted into rectangular signals Ds and Do, respectively, through the comparators 131 and 132. The phase deviation detecting circuit 140 compares the phase difference between the reference signal Vs and the received signal Vo of rectangular waveforms, and outputs a detect signal that corresponds to the deviation of phase. FIGS. 15 and 16 are time charts explaining the operation of the phase deviation detecting circuit 140. As shown in FIG. 15, when the phase of the wave Do of the diagram (B) is advancing ahead of the wave Ds of the diagram (A), signals Q and QB output from the RS flip-flop 141 become as shown in FIGS. 15(C) and 15(D). As a result, no signal is output from the NOR gate 142 and a charge signal Csl is output from the NOR gate 143. As shown in FIG. 16, furthermore, when the wave Do of the diagram (B) is delayed being the wave Ds of the diagram (A), the signals Q and QB output from the RS flip-flop 141 become as shown in FIGS. 16(C) and 16(D). As a result, no signal is output from the NOR gate 143 and a discharge signal Dsl is output from the NOR gate 142.

In the phase difference-voltage converter circuit 150, the capacitor 153 is charged or discharged by the charge signal Csl or the discharge signal Dsl from the phase deviation detecting circuit 140, and the data of phase deviation is converted into a voltage data. That is, when the phase of the received signal Vo is advancing ahead of the phase of the reference signal Vs, the analog switch 151 is turned on at a timing "H" of the charge signal Csl and the capacitor 153 is charged. As a result, the voltage of the phase adjusting data Pc output from the phase difference-voltage converter circuit 150 increases. When the phase of the received signal Vo is delayed behind the phase of the reference signal Vs, on the other hand, the analog switch 152 is turned on at a timing "H" of the discharge signal Dsl and the capacitor 153 is discharged. As a result, the voltage of the phase adjusting data Pc decreases.

The phase adjusting circuit 110 is constituted by two phase circuits made up of operational amplifiers, i.e., constituted by a circuit that delays the phase by $\theta$ and a circuit that advances the phase by $\theta$, so that the phase is shifted as a whole by an amount of 0°. Here, the variable resistor 111 of the voltage-controlled type is added to the circuit constant of the circuit for delaying the phase in the preceding stage, such that the phase of a signal output from the phase adjusting circuit 110 can be varied in both the positive direction and the negative direction, with 0° as a center, depending upon the voltage of the phase adjusting data Pc applied to the phase adjusting circuit.

When the variable resistor 111 is of the type whose resistance varies depending upon the voltage applied from the external unit maintaining a negative gradient, i.e., whose resistance decreases with an increase in the voltage and increases with a decrease in the voltage, then the phase of the output of the phase adjusting circuit 110 advances with an increase in the voltage of the phase adjusting data Pc and is, conversely, delayed with a decrease in the voltage. Therefore, when the phase of the reference signal Vs is advancing ahead of the received signal Vo, the potential of the phase adjusting data Pc increases and whereby the phase adjusting circuit 110 delays the phase of the AC signal AC, such that the phases are brought into agreement between the reference signal Vs and the received signal Vo. Moreover, when the phase of the reference signal Vs is delayed behind the received signal Vo, the potential of the phase adjusting data Pc decreases and whereby the phase adjusting circuit 110 advances the phase of the AC signal AC, such that the phases of the reference signal Vs and the received signal Vo are brought into agreement.

A difference in the amplitude of signals does not take part in the control system that brings the phases into agreement between the reference signal Vs and the received signal Vo. That is, when the reference signal Vs and the received signal Vo are to be shaped into rectangular waves in the waveform shaping circuit 130, use of the zero-cross comparator circuit makes it possible to detect a phase difference without relying upon the amplitude of the signal.

The difference detecting circuit 160 is the one in which between the two input signals, one input signal is subtracted from the other input signal. Here, the reference signal Vs is used as a minuend signal and the received signal Vo is used as a subtraction signal. Here, since the reference signal Vs and the received signal Vo are sinusoidal waves whose phases are agreement with each other, the difference detecting circuit 160 outputs a sinusoidal wave which is proportional to the difference of the amplitude.

The synchronizing signal detecting circuit 170 constitutes a rectifier of the synchronous type by using an operational amplifier. The amplitude only of the difference signal output from the difference detecting circuit 160 makes it possible to detect the difference in absolute value between the reference signal Vs and the received signal Vo, but does not make it possible to judge the positive sign or negative sign thereof. However, if the phase for detecting the amplitude of the difference signal is fixed, then a relationship of magnitude between the reference signal Vs and the received signal Vo can be judged.

FIGS. 17 and 18 are diagrams of waveforms for explaining the operations of the difference detecting circuit 160 and the synchronizing signal detecting circuit 170. FIG. 17 illustrates the case where Vs>Vo and FIG. 18 illustrates the case where Vs<Vo. In the case of FIG. 17, the reference signal Vs and the received signal Vo has a relationship of magnitude of Vs>Vo, and the difference signal output from the difference detecting circuit 160 assumes a waveform as shown in FIG. 17(C). The synchronizing signal detecting circuit 170 permits the passage of a control signal of FIG. 17(D) at a timing "H" only in an inverted manner, and its output assumes a waveform as shown in FIG. 17(E). In the case of FIG. 18, the reference signal Vs and the received signal Vo has a relationship of magnitude of Vs<Vo. Therefore, the difference signal output from the difference detecting circuit 160 assumes a waveform as shown in FIG. 18(C) and the output of the synchronizing signal detecting circuit 170 assumes a waveform as shown in FIG. 18(E).

The output from the synchronizing signal detecting circuit 170 is converted into a DC voltage Dc having a positive or negative sign through the low-pass filter 180, and is further converted through a DC converter circuit 190 into an amplitude difference data Sc which is a DC signal having the positive sign only. The input to the DC converter circuit 190 is a DC signal which changes into a positive potential or a negative potential depending upon a relationship of magnitude of amplitude between the reference signal Vs and the received signal Vo. When the sinusoidal wave is shaped by a comparator 191 that uses the above signal as a reference potential, the output of the comparator 191 becomes as shown in FIG. 19(B) provided the DC voltage Dc has the positive sign as shown in FIG. 19(A). A NOR gate 192 which inputs the signal of FIG. 19(B) and a signal $\overline{Ds}$ of FIG. 19(C) produces an output which is a charge signal Ds2 shown in FIG. 19(D). When the DC voltage Dc has a negative sign as shown in FIG. 20(A), the output of the comparator 191 becomes as shown in FIG. 20(B). An AND gate 193 which inputs the signal of FIG. 20(B) and a signal Ds of FIG. 20(C) produces an output which is a charge signal Cs2 shown in FIG. 20(E).

When the amplitude of the reference signal Vs is greater than the amplitude of the received signal Vo, an analog switch 195 is turned on by the discharge signal Ds2 and a capacitor 196 is discharged. As a result, the voltage of the amplitude difference data Sc output from the DC converter circuit 190 decreases. When the amplitude of the reference signal Vs is smaller than the amplitude of the received signal Vo, on the other hand, an analog switch 194 is turned on by the charge signal Cs2 and the capacitor 196 is charged. As a result, the voltage of the amplitude difference data Sc output from the DC converter circuit 190 increases.

The amplitude adjusting circuit 120 is an inverting amplifier which uses, as an input resistor, a variable resistor 121 of the same voltage-controlled type as the one used in the phase adjusting circuit 110. Therefore, the amplification factor of the amplitude adjusting circuit 120 increases with an increase in the potential of the amplification difference data Sc, and decreases with a decrease thereof. When the amplitude of the reference signal Vs is greater than that of the received signal Vo, therefore, the amplification factor of the amplitude adjusting circuit 120 decreases and, as a result, the amplitude of the reference signal Vs decreases. When the amplitude of the reference signal Vs is smaller than that of the received signal Vo, on the other hand, the amplification factor of the amplitude adjusting circuit 120 increases and, as a result, the amplitude of the reference signal Vs increases. Accordingly, the amplitudes are brought into agreement of the reference signal Vs and the received signal Vo.

Described below are a concrete method of data communication in the data carrier system according to the present invention, the problem of interference among the fixed facilities that are arranged close to each other, and a means for solving the problem.

Figure 28A:
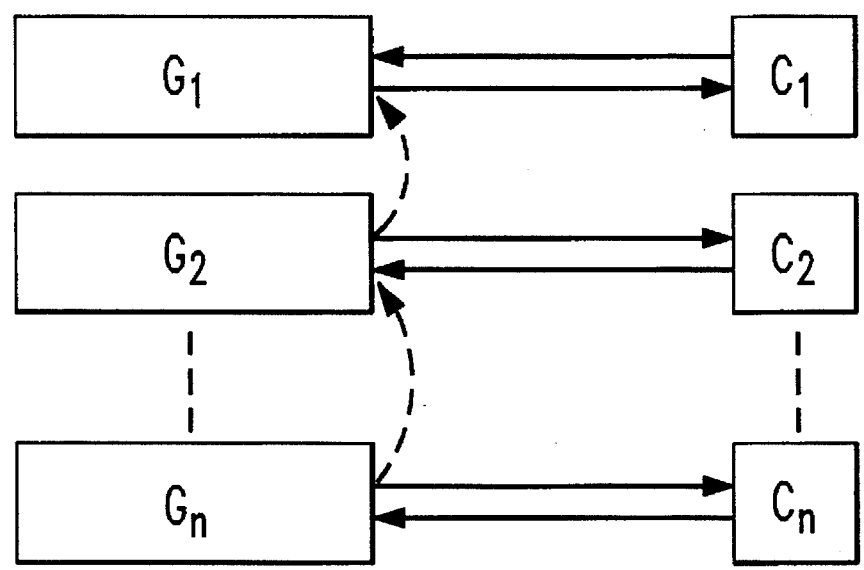
FIGS. 28(A–B) is a diagram explaining the principle of the method of transmitting signals in the data carrier system of the present invention.

That is, in the data carrier system according to the present invention as shown in FIG. 28(A), where a plurality of fixed facilities are arranged in parallel, and the individual fixed facilities G1, G2, ..., Gn can communicate at any time with the individual data carriers C1, C2, ..., Cn.

In the data carrier system of the invention, first, a given fixed facility Gn feeds an electromagnetic wave to a data carrier Cn to which the communication is to be made but which has no power source, in order to feed the electric power to the data carrier Cn. That is, a period $T_0$ for transmitting a carrier wave having a predetermined frequency and a period $T_1$ for transmitting necessary data in the form of a modulated wave by modulating the carrier wave from the fixed facility Gn to the data carrier Cn, are set in a time-divisional manner maintaining a predetermined time interval as depicted by GDS1 in FIG. 29. On the side of the data carrier Cn, on the other hand, when the electromagnetic wave is received as depicted by GDS1 in FIG. 29, a predetermined voltage is generated in the data carrier Cn based on the electromagnetic wave during the period $T_0$ and during the next period $T_1$, the arithmetic processing is executed in the data carrier Cn based upon the data received from the fixed facility Gn, and the data carrier Cn sends back to the fixed facility Gn the modulated wave that is superposed on the carrier wave received from the fixed facility Gn to reply to the message from the fixed facility Gn.

It is desired that a timing period T2 in which the data carrier Cn sends the reply data back to the fixed facility Gn has been set to be in synchronism with the period $T_0$ in which the fixed facility Gn sends the carrier wave having the above predetermined frequency.

Therefore, the fixed facility actuates the predetermined detecting circuit in synchronism with the timing period $T_2$ during which the predetermined data is sent from the data carrier Cn, and detects and picks up only the predetermined signal data that are sent back from the data carrier Cn.

The above system constitution will be described below in further detail with reference to FIG. 29.

Figure 28B:
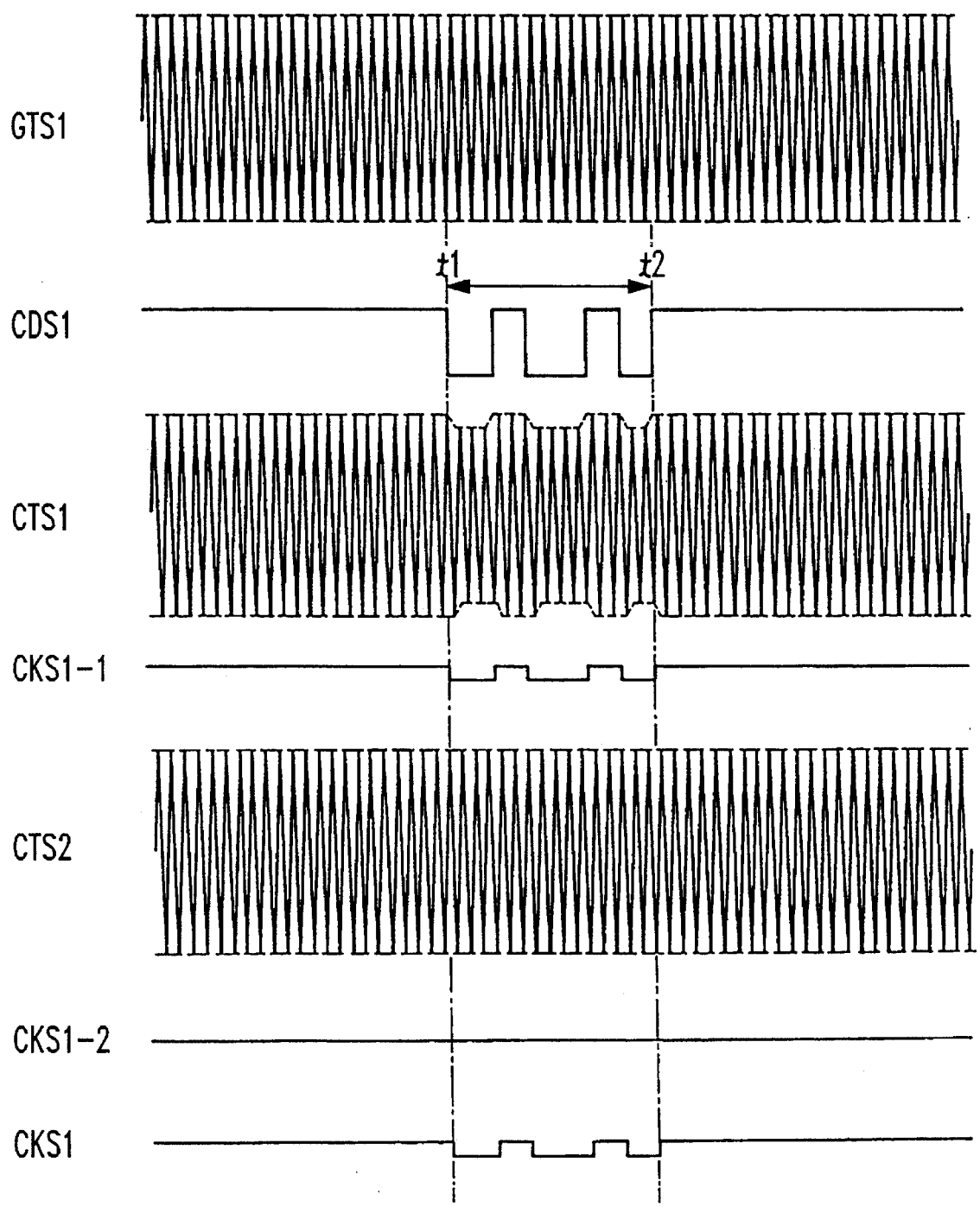
Figure 29:
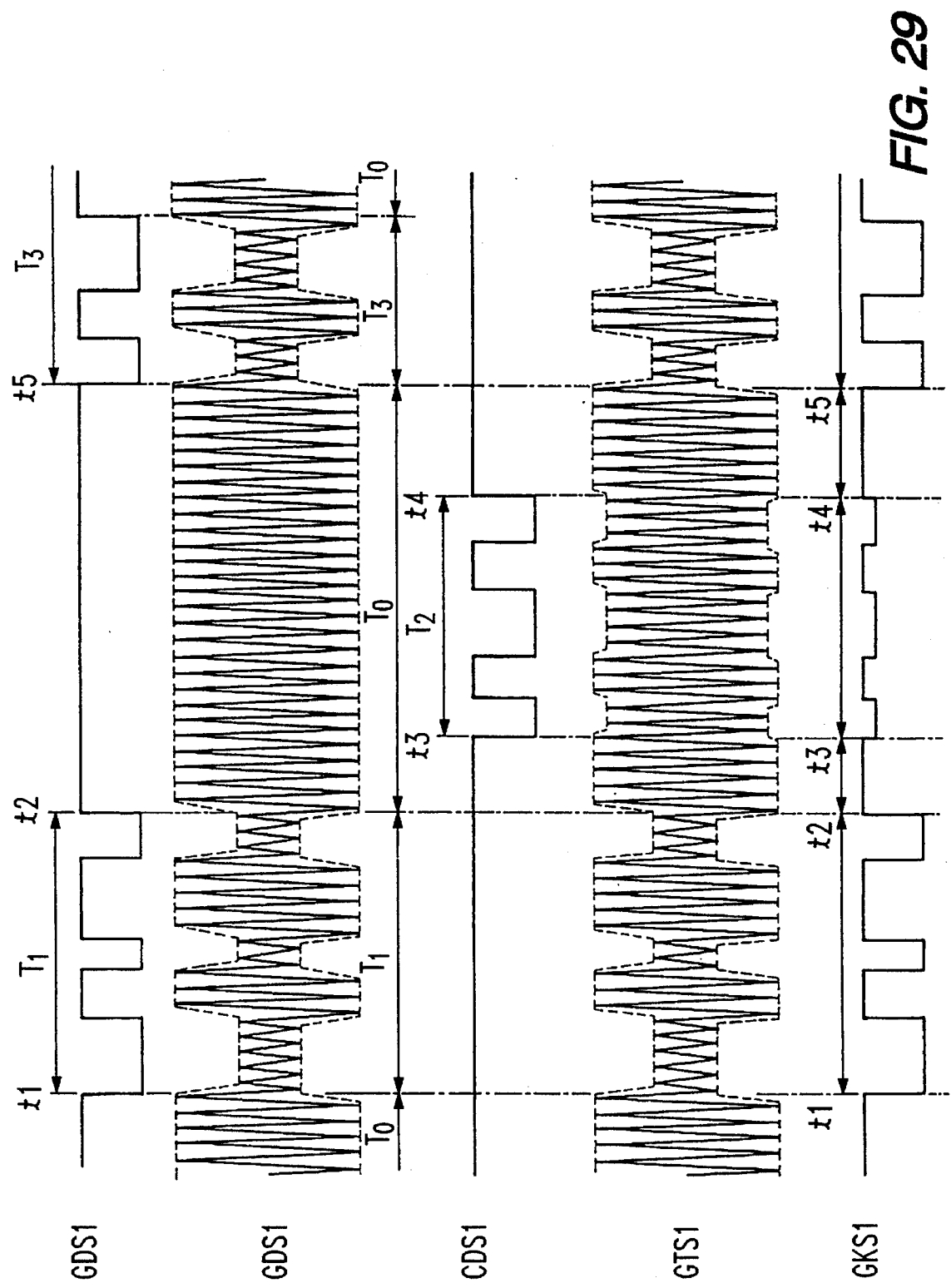
FIG. 29 is a diagram showing AC signal waves that flow through a fixed facility containing enquiry signals transmitted from the fixed facility and data sent back from the data carrier according to the present invention.
Figure 30:
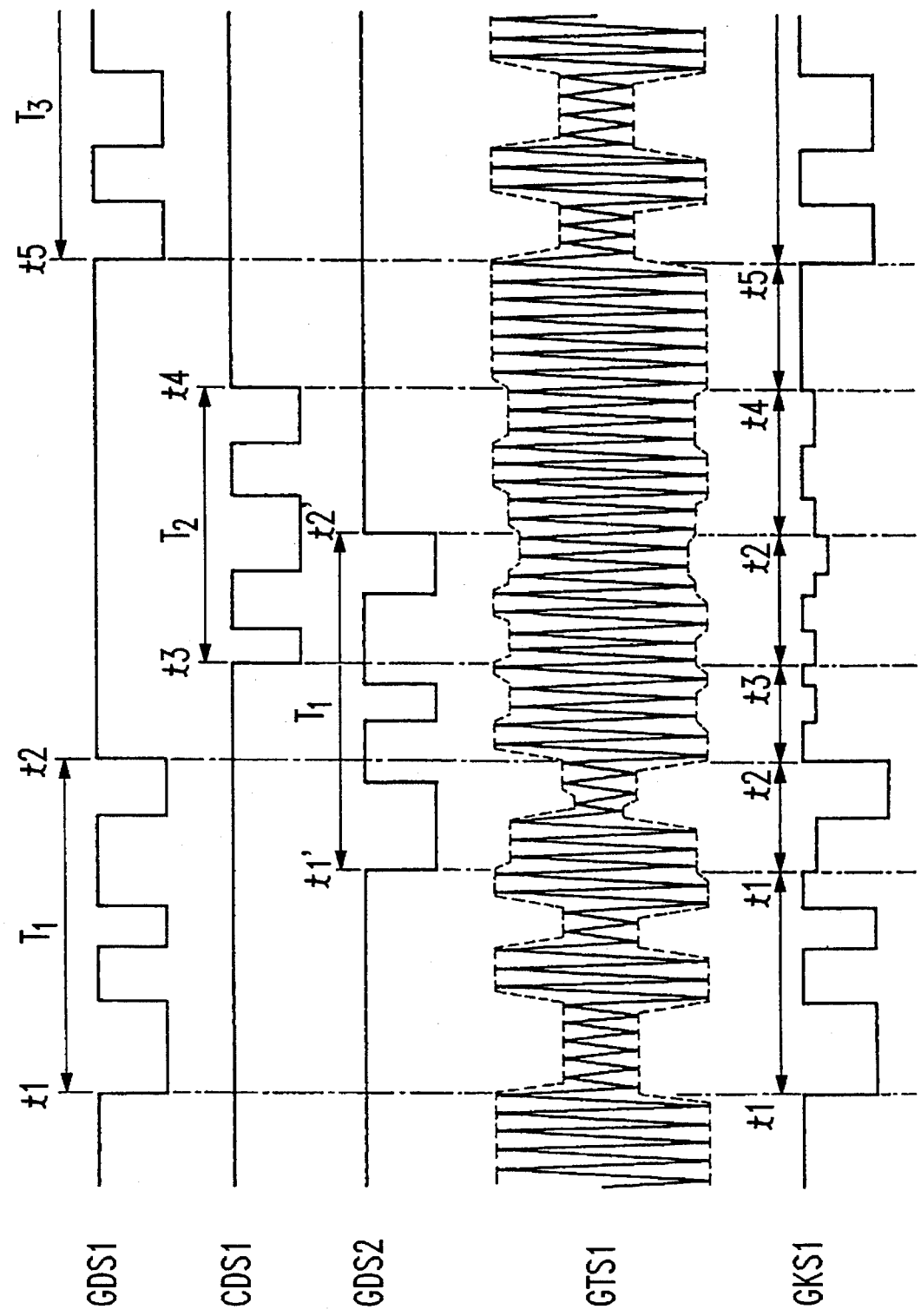
FIG. 30 is a diagram showing a state in which the AC signal waves in the fixed facility are modulated with interference signal waves from other neighboring fixed facility in the data carrier system.

Described below next are transmission/reception system of the resonance condition control type data carrier of the present invention and the interference operation among the fixed facilities in conjunction with FIGS. 29 and 30 which illustrate transmitted and received waveforms of the data carrier and the fixed facility corresponding to those of FIG. 28, wherein FIG. 29 illustrates the case where there exists no other fixed facility in the neighborhood and FIG. 30 illustrates the case where other fixed facilities exist. In FIG. 29, GDS1 denotes a data signal of the fixed facility G1, CDS1 denotes a data signal of the data carrier C1, and GTS1 denotes an AC magnetic field sent from the fixed facility G1 to the data carrier C1, which is also sent from the data carrier C1 to the fixed facility G1 in the case of the resonance condition control type as in this embodiment. GKS1 denotes a detect signal in the fixed facility G1.

That is, in this embodiment, an AC magnetic field GTS1 is transmitted and received in a form of time sharing method. For example, the AC magnetic field CDSL is modulated by the data signals GDS1 of the fixed facility G1 in odd-number sections such as of T1, T3, and the carrier wave or AC magnetic field GTS1 is modulated by the data signals CDS1 from the data carrier C1 in even-number sections such as of T2, T4, in order that the AC magnetic field GTS1 generated from the fixed facility G1 is alternatingly utilized for transmission and reception.

The modulated component of the AC magnetic field GTS1 is taken out as a detect signal GKS1 by the detecting circuit in the fixed facility G1. By effecting the selection using a time-division signal T2, furthermore, the data signal CDS1 of the data carrier C1 corresponding to the section T2 can be correctly taken out.

Next, described below with reference to FIG. 30, is the case where another fixed facility G2 exists. FIG. 30 illustrates the case where a data signal GDS2 from another fixed facility G2 exists in addition to the signals of FIG. 29. On the AC magnetic field GTS1 of the fixed facility G1 are superposed interference components modulated by the data signal GDS2 of the fixed facility G2, which is time-divisionally out of synchronism, in addition to the components modulated by GDS1 and CDS1 shown in FIG. 29. That is, the AC magnetic field of the fixed facility G2 having a strong component modulated by GDS2 is caught by the antenna of the fixed facility G1, so that the amplitude of the AC magnetic field GTS1 changes substantially.

Accordingly, components modulated by the data signal CDS1 of the data carrier C1 and by the data signal GDS2 of the fixed facility G2 are detected as detect signals GKS1 in the section T2 of the fixed facility G1; i.e., the waveform same as that of the detect signal GKS1 of FIG. 29 is not obtained, and the data is not correctly read out.

As for the signal levels of the AC magnetic field GTS1 and the detect signal GKS1, modulation of the resonance condition control system carried out by the modulation circuit 20 based on the data signal CDS1 of the data carrier C1 is very weak compared with a strong modulation effected by the data signal GDS1 of the fixed facility. The amounts of modulation by the data signals GDS1 and CDS1 in the AC magnetic field GTS1 shown in FIGS. 29 and 30, in practice, have a greater difference, and the modulation by the data signal CDS1 is of a level that is almost not discernible. Therefore, the AC magnetic field generated from the other fixed facility G2 is modulated by the data signals GDS2 and CDS2. However, since the modulation by CDS2 is negligibly small as described above, it can be almost neglected in terms of an interference signal component at the fixed facility G1.

Described below is the structure of the antenna that is used in the fixed facility of the present invention.

Figure 21A:
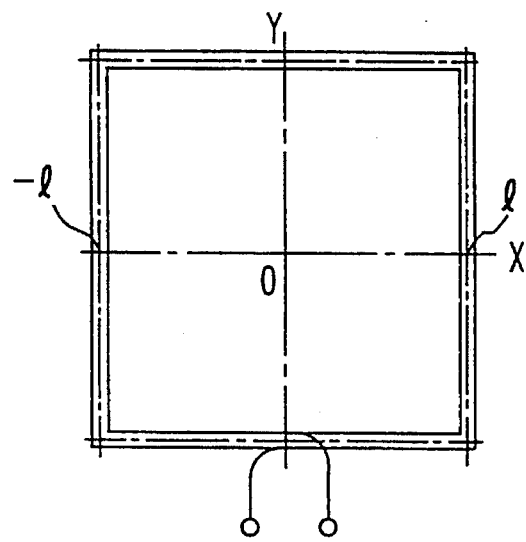
FIGS. 21(A–B) is a plan view of a conventional antenna and a graph showing the intensity of an electromagnetic field thereof.

In the conventional electromagnetically coupled data carrier system, a simple frame-type coil, as shown in FIG. 21(A), has been used as an antenna for generating AC magnetic fields for feeding electric power from the fixed facility. With the coil of this type in which the winding exists as a solid group of wirings mass, the electromagnetic field is very strong near the winding but is not so strong near the center of the coil.

Figure 21B:
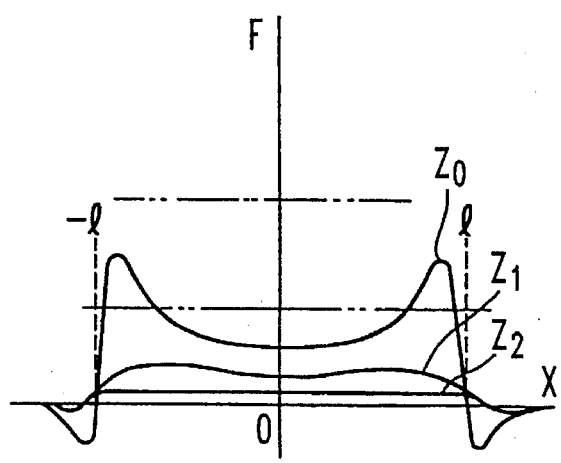

FIG. 21(B) is a graph illustrating the intensity distribution of the magnetic field established by the frame-type coil, wherein the ordinate represents the intensity F of the magnetic field on a plane perpendicular to the coil plane passing through the center axis X of the frame-type coil and the abscissa represents the coordinate on the center axis X. Three curves on the graph represent intensities of the electromagnetic field at distances z0, z1 and z2 from the coil plane, where z0 represents a distance 0, and there exists a relationship z0<z1<z2. Performance of the data carrier in many cases is evaluated in terms of a communicable distance in front of the antenna, and a simply constructed frame-type coil becomes disadvantageous since it is not capable of intensifying the electromagnetic field near the center thereof.

Figure 22A:
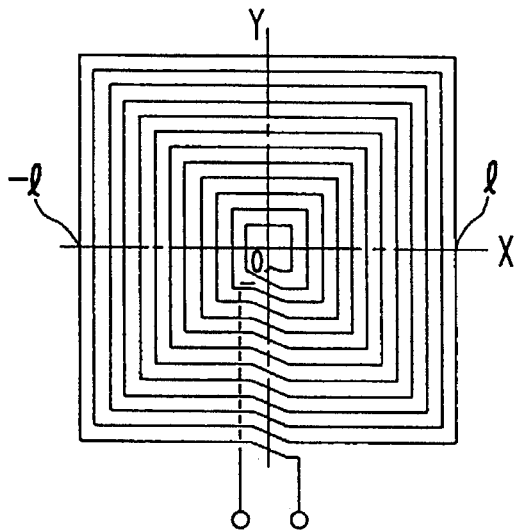
FIGS. 22(A–B) is a plan view of a conventional antenna and a graph showing the intensity of an electromagnetic field thereof.
Figure 22B:
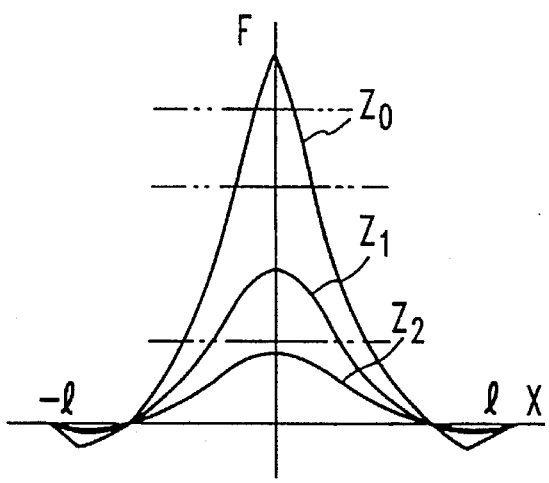

In order to improve such a defect, it has been attempted to use as an antenna a shunt coil having a vortex-type winding structure as shown in FIG. 22(A). FIG. 22(B) is a graph illustrating the distribution of electromagnetic field intensities established by the vortex-type shunt coil, where the notations are the same as that of the case of FIG. 21. With the coil of this type as will be obvious from the graph, the electromagnetic flux produced by a current of the coil converges on a vertical axis at the center on the coil plane. Therefore, the communicable distance of the data carrier becomes a maximum on the vertical axis at the center of the coil, which is a very good performance from the standpoint of simply extending the communicable distance. However, since the electromagnetic flux tends to be converged too strongly, the electromagnetic field is weakened sharply as it is separated away even by a small distance from the vertical axis at the center of the coil and the communicable distance is shortened. Therefore, the communicable region becomes very narrow in a direction in parallel with the coil plane.

According to the present invention, therefore, use is made of a coil which has a vortex-type winding on a plane and in which the density of the winding is scarce near the center of the vortex and is dense toward the outer periphery of the vortex as an antenna of the fixed facility in the data carrier system. This to remove defects inherent in the prior art and to realize a coil structure for the antenna for the fixed facility, which maximizes the communicable distance of the data carrier in front of the antenna, yet maintains a predetermined communicable range even in the regions deviated toward right and left as well as up and down from the front surface of the antenna.

In the conventional frame-type coil as described above, the electromagnetic field is weak at the center of the coil but becomes strong toward the outer periphery near the winding. In the conventional vortex-type coil, on the other hand, the electromagnetic field becomes a maximum at the center of the coil and becomes weak toward the outer periphery. According to this embodiment, attention is given to the characteristics of the above conventional two types of coils, and the coil is fabricated in a structure intermediate therebetween so that it exhibits characteristics of both of them. That is, weak magnetic field areas of the above conventional two types of coils are complemented.

Figure 23:
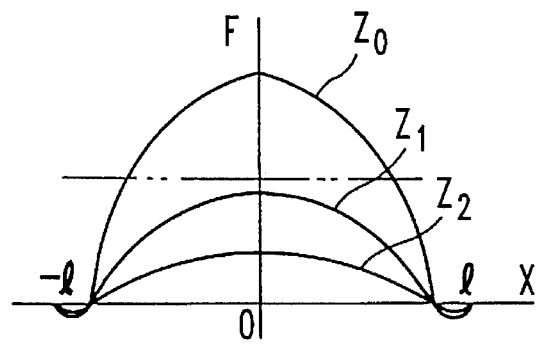
FIG. 23 is a graph showing the intensity of an electromagnetic field using an antenna improved by the present invention.

A graph of FIG. 23 illustrates distributions of magnetic field intensities generated by the above improved antenna, and wherein the notations are the same as those of FIG. 21(B)

FIG. 24 illustrates a first embodiment of the antenna coil, wherein FIG. 24(A) illustrates a plane structure of the winding of the coil and FIG. 24(B) illustrates the structure in cross section. In this embodiment, a winding 100 of the antenna coil has nearly a square shape on a plane and is fabricated in a single-layer vortex structure having a coil winding start terminal 200 and a winding end terminal 300. The winding 100 starts from the central portion in the counter clockwise direction, and the length of a side increases after every turn up to the outer peripheral portion. Here, the amount of increase of a side is great near the central portion and gradually decreases toward the outer periphery. As a result, the winding density is small at the center of the vortex and increases toward the outer periphery.

FIG. 25 illustrates a second embodiment of the antenna coil, wherein FIG. 25(A) illustrates the structure of the coil winding on a plane and FIG. 25(B) illustrates the structure in cross section. Even in this embodiment, the winding 1 of the antenna coil has a nearly square shape on a plane but is wound in an overlapped manner in cross section, the number of overlapped turns being small at the center of the vortex but increasing toward the outer periphery. As a result, the winding density is small at the center of the winding but increases toward the outer periphery.

FIG. 26 illustrates a third embodiment of the antenna coil in which the winding has a double vortex structure. That is, the coil winding 100 starts from the outer periphery of the antenna and is wound in the counterclockwise direction toward the center and, then, starts again from the center toward the outer periphery and is wound in the counterclockwise direction. This embodiment has a winding structure which is somewhat complicated but is basically the same as that of the embodiment of FIG. 24; i.e., the winding density is small at the center but increases toward the outer periphery.

FIG. 27 illustrates another antenna that is included in the scope of the above embodiment. In this case, however, the outermost turn of the plane vortex-type coil is wound simply in an overlapped manner and realizes the principle of the present invention in the simplest manner.

In the foregoing were described embodiments of the invention in detail, and in which the coils were all in a square shape on a plane. According to the present invention, however, the plane shape of the antenna coil or the coil need not be necessarily limited to a square shape but may be a rectangular shape, a circular shape, an oval shape or any other shape.

The present invention made it possible to realize a method of sending the data and a method of detecting and demodulating the signal sent from the data carrier in a fixed facility in the electromagnetically coupled data carrier system. Owing to the fixed facility, it is made possible to compress and exclude noise induced by an AC magnetic field generated by other neighboring fixed facility. It is therefore made possible to realize the data carrier system for effecting two-way data communication by using the electromagnetically coupled data carrier. This means that not only the data but also the control command can be sent to the data carrier, contributing to strikingly increasing the number of function which the data carrier can include. Moreover, since the fixed facilities of the same kind are installed at relatively close positions and are allowed to be simultaneously operated, the range of applications is broadened. For instance, devices must be installed in parallel where it is required to identify a large number of persons at one time such as at an entrance or exit of a factory or a business corporation. The system of the invention, however, does not cause interference among the fixed facilities, offers freedom in installation conditions, and does not require space. When used as an industrial tag system for identifying the products or recording the production history in an automated factory, the system of the present invention does not affect the designing of the line layout of the factory.

According to a further embodiment of the present invention, a change in the signal caused by a change in the surrounding environment or by a change in the circuit characteristics of the fixed facility caused by the lapse of time, is corrected by a correction circuit, so that a normal signal is always output to the subtraction circuit. It is therefore possible to set the amplification factor of the amplifier of the latter stage high and to sufficiently perceive data even in very small signals from the data carrier. This, in other words, means an increase in the possible communication distance between the data carrier and the fixed facility. Use of the data carrier system of the present invention therefore makes it possible to expand the range of applications into fields that could not be realized with the existing communication performance. Moreover, since the voltage adjusting circuit needs no adjustment, it is possible to reduce the amount of work for adjustment when the data carrier system is practically operated and to decrease the amount of maintenance work.

When the antenna disclosed in the present invention is used for the fixed facility of the data carrier system, furthermore, it is possible to converge the AC electromagnetic flux generated from the fixed facility to the vertical axis at the center of the antenna and, at the same time, to impart a predetermined spread in a direction parallel with the coil plane. As a result, it is possible to greatly extend the communicable distance of the data carrier in front of the center of the antenna as well as to extend the communicable distance even on the regions that are deviated by a predetermined range toward up and down, and right and left from the center of the antenna in parallel with the antenna plane.

Thus, if the distribution of electromagnetic field is set to a practically optimum condition, then there is no need to feed too much electric power to the antenna of the fixed facility. This enables the structure of the antenna drive circuit in the fixed facility to be simplified presenting advantage in economy, and the intensity of the emitted electromagnetic waves to be decreased, contributing greatly to decreasing the probability of contaminating the electromagnetic environment around the facilities.

In designing the antenna for the data carrier system based on the present invention, the conditions related to the density and arrangement of the coil winding are computed by a computer simulation, so that the distribution of the electromagnetic field intensities around the antenna can be designed to an optimum shape. A performance which is practically sufficient can be obtained even by a trial-and-error method instead of the computer simulation.

Described below is another embodiment of the data carrier system according to the present invention.

That is, in the aforementioned data carrier system of the present invention, a plurality of fixed facilities are arranged close to each other and are connected together through a cable for transmitting synchronizing signals. In other words, all the fixed facilities are coupled together in a DC manner. Therefore, if one fixed facility is struck by lightning, the electric current is conducted to other fixed facilities so that the other fixed facilities may be destroyed. Moreover, when the power source of a given fixed facility becomes defective and no longer supplies electric power, the synchronizing signal generating means ceases its function causing all of the plurality of fixed facilities to be put out of operation.

In order to solve the above-mentioned problem, the present invention employs, for example, the constitution that is described below. That is, a data carrier system comprising power sourceless electromagnetically coupled data carriers and fixed facilities that effect two-way data communication relative to said data carriers, wherein a synchronizing signal is transmitted from a synchronizing signal generating means contained in a particular fixed facility to other plurality of fixed facilities in order to produce, in the plurality of fixed facilities, the same frequencies and phases of AC magnetic fields that are generated to transmit electric power and data to the data carrier, and wherein the synchronizing signal is transmitted from the synchronizing signal generating means contained in a particular fixed facility to other fixed facilities through an insulated means that is insulated in a DC manner from the synchronizing signal generating means and, at the same time, from the power sources contained in the individual fixed facilities which are separated in a DC manner from the other fixed facilities.

With the above constitution in which the synchronizing signal is transmitted to other fixed facilities from the synchronizing signal generating means contained in a particular fixed facility through the insulated means that is insulated therefrom in a DC manner in order to render to be the same among the plurality of fixed facilities the frequencies and phases of AC magnetic fields that are generated from the fixed facilities to transmit electric power and data to the data carriers, lightning that may fall on one fixed facility destroys the power source in this facility but does not destroy power sources in other facilities. Moreover, even if some fixed facilities cease to operate, the operations of the other fixed facilities are maintained by independent power sources and the plurality of fixed facilities do not all cease to function.

Figure 31:
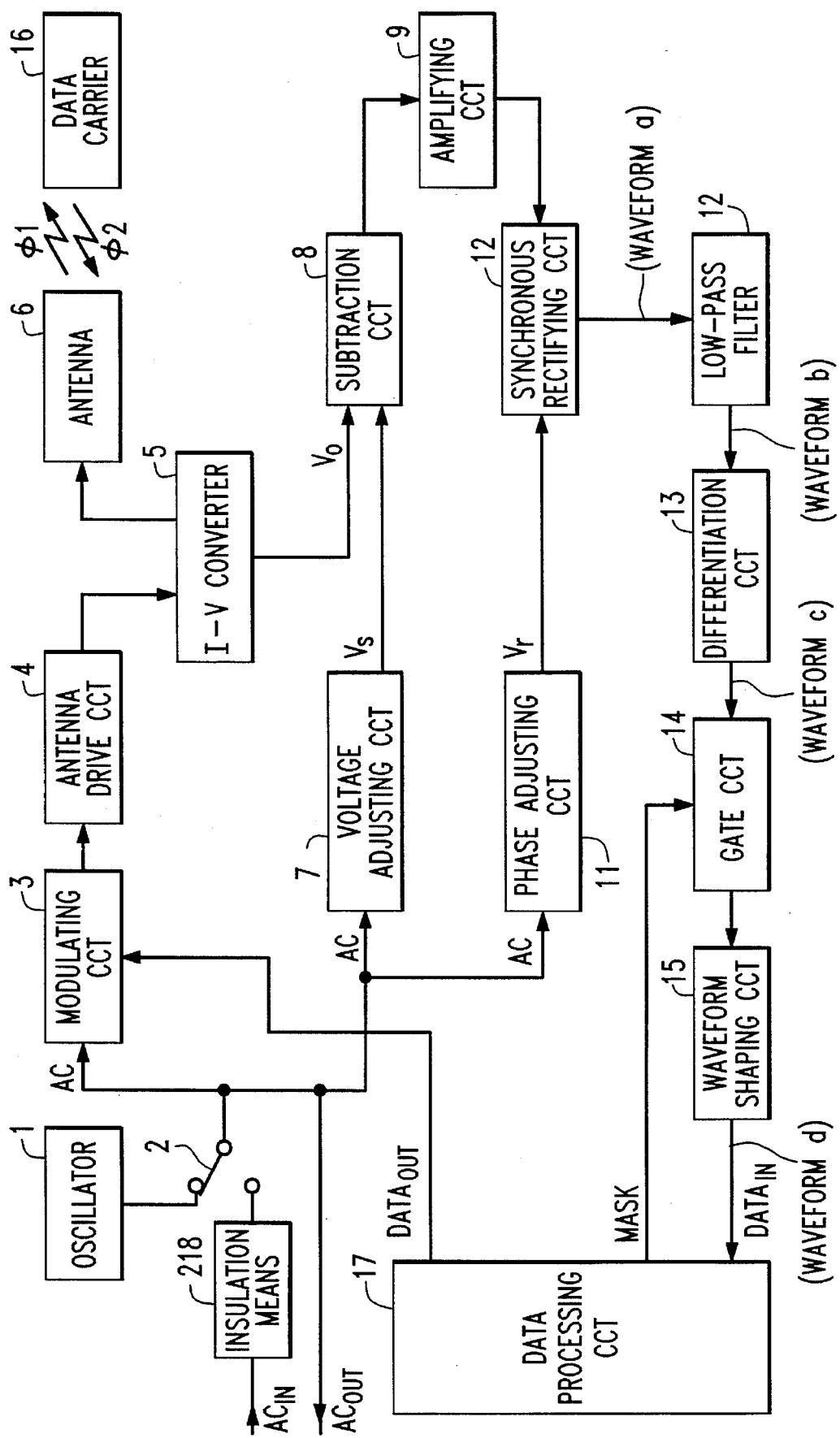
FIG. 31 is a diagram showing an insulation means which is connected to an input/output terminal of an AC signal generating circuit of the invention.

The circuit constitution according to a further embodiment of the invention is shown in FIG. 31, wherein the fundamental circuit constitution is the same as that of FIG. 1 except that an insulation means 218 is provided for an input/output means (ACin, ACout).

That is, the insulation means 218 insulates in a DC manner a signal fed from an external unit from the fixed facility. The AC signal AC is fed from a signal output terminal ACout to terminal ACin of the other neighboring fixed facility. The terminal ACin of the other fixed facility is similarly provided with an insulation means so that the AC signal is fed while being insulated in a DC manner. Thus, the two fixed facilities are allowed to use the same AC signal AC, and are insulated in a DC manner from each other. Therefore, lightning that hits on one fixed facility is not transmitted to another one. In this embodiment, the AC signal AC is distributed to the modulating circuit 3, voltage adjusting circuit 7 and phase adjusting circuit 11.

Figure 32:
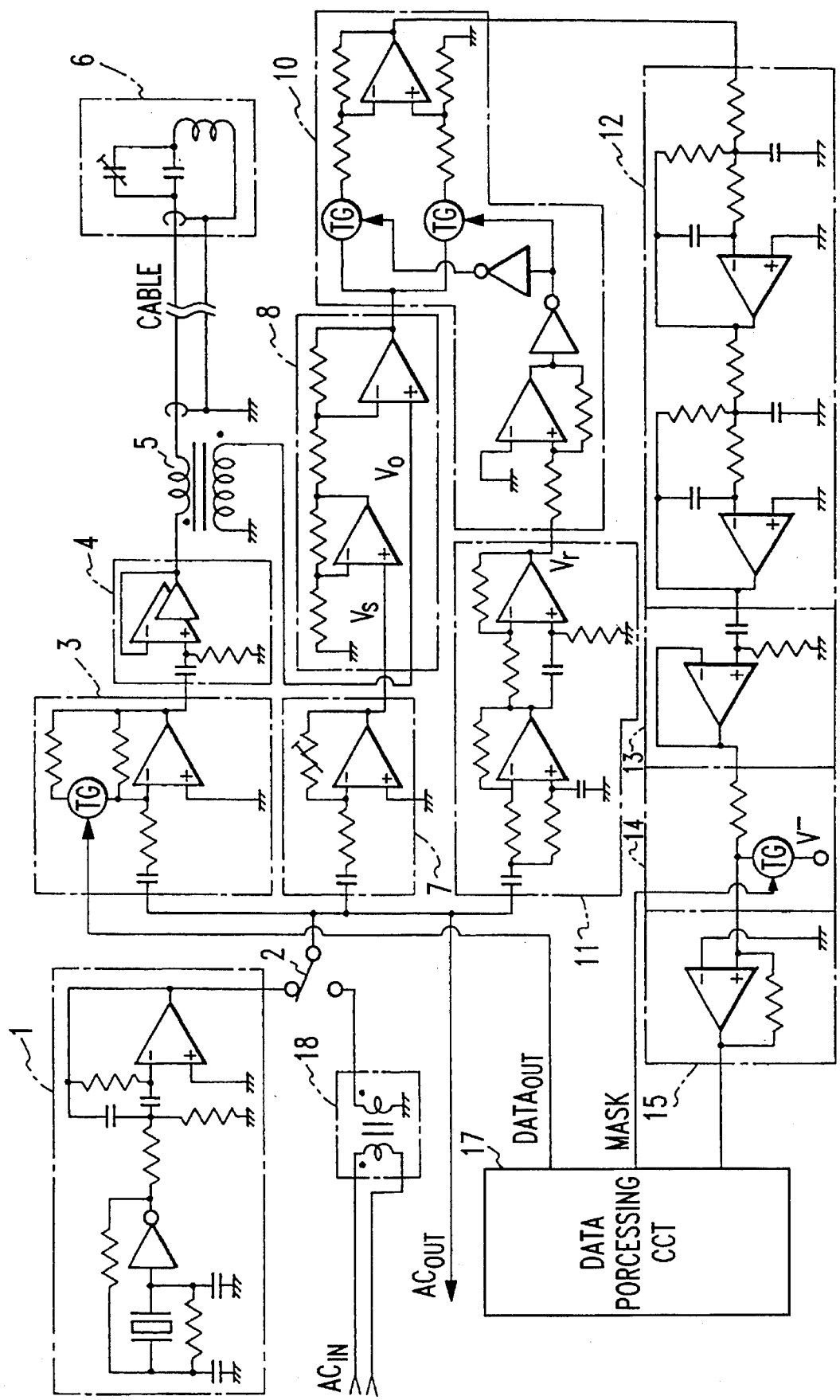
FIG. 32 is a diagram which concretely illustrates the insulation means of FIG. 31.

FIG. 32 is a circuit diagram which concretely illustrates the embodiment of FIG. 31, and is equivalent to the embodiment of FIG. 5 in which a transformer 18 for DC insulation is added to the terminal ACin.

Figure 33:
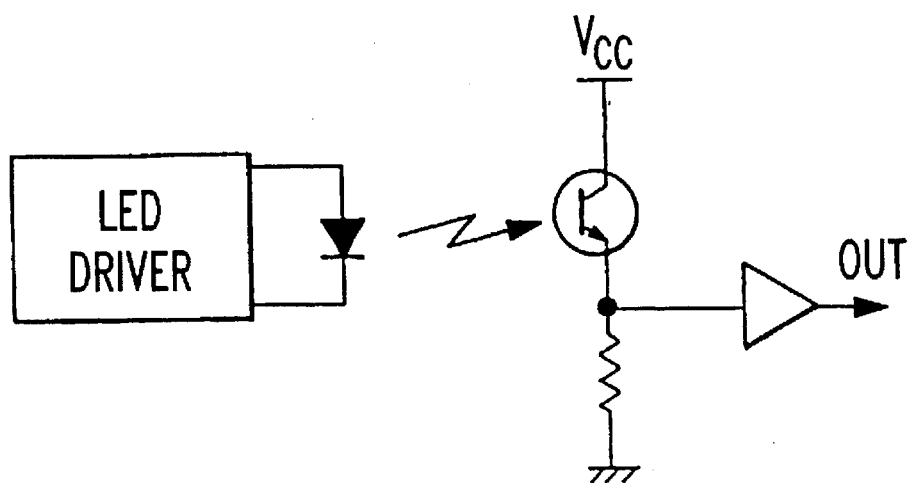
FIG. 33 is a diagram of a photocoupler that is used as the insulation means.

A first embodiment of the insulation means 218 of the invention was described above with reference to FIG. 32, but the circuit of the invention can be realized in various other forms. That is, the insulation means 218 can be realized, in addition to the above, in a light-coupled system using a light-emitting element and a light-receiving element as shown in FIG. 33, in a sound-coupled system using ultrasonic waves or in a wireless system using electromagnetic waves. In effect, the synchronizing signals be transmitted in a non-contacting manner, and the insulating method is in no way limited to a transformer.

According to the present invention as described above, the synchronizing signal is transmitted to other fixed facilities from the synchronizing signal generating means contained in a particular fixed facility through the insulation means that is insulated therefrom in a DC manner. Therefore, even when lightning hits a given fixed facility, the electric shock is confined within this fixed facility and is not transmitted to other facilities. This is very advantageous when the system is installed, for example, outdoors.

We claim:

1. A data carrier system in an automatic management system comprising:

a plurality of adjacent fixed facilities each having a constant two-way communication area;

a data carrier for carrying out a two-way communication with a selected one of the plurality of adjacent fixed facilities; and selective detecting means installed in each of the plurality of adjacent fixed facilities for detecting the data signal from the data carrier;

the selected one of the plurality of fixed facilities recognizing stored data of a data carrier present in the constant communication area after receiving a data signal induced by an AC magnetic field generated by the data carrier present in the constant communication area of the fixed facilities, and the selected one of the plurality of fixed facilities rewriting the stored data of the data carrier by transmitting to the data carrier a rewriting signal induced by the AC magnetic field;

the selective detecting means detecting the data signal by discriminating the data signal induced by the AC magnetic field generated by the data carrier, from the data signals induced by the AC magnetic fields from the fixed facilities other than the selected one of the plurality of fixed facilities.

2. A data carrier system according to claim 1, comprising:

control means in each of the plurality of adjacent fixed facilities for rendering the frequencies and the phases of the AC magnetic fields to transmit the rewrite signal to the data carrier present in a respective communication area of the fixed facilities to be the same among the fixed facilities other than the selected one of the plurality of fixed facilities.

3. A data carrier system according to claim 2, wherein the control means is a common signal forming means for rendering the same AC signals that are sources for generating AC magnetic fields from the fixed facilities.

4. A data carrier system according to claim 3, wherein the fixed facilities further comprise:

an antenna that transmits the AC signals as the AC magnetic fields;

received signal detecting means for detecting as a received signal an antenna current, the antenna current including a change in the AC magnetic field transmitted from the antenna based on the stored data of the data carrier; and synchronous detecting means, including a synchronous clock, for synchronously detecting the change as a data signal by synchronously detecting the received signal;

the synchronous clock being constituted by the AC signals that are rendered to the same by the common signal forming means.

5. A data carrier system according to claim 3, wherein the selective detecting means comprises a synchronous detecting circuit that uses synchronized clocks formed by AC signals that are rendered to be the same by the common signal forming means.

6. A data carrier system according to claim 1, wherein the plurality of adjacent fixed facilities comprises an antenna for emitting the AC magnetic field, the AC magnetic field forming an AC magnetic field region defining a communication area in which a data carrier that moves relative to the fixed facility remains long enough to transmit necessary data between the data carrier and the fixed facilities.

7. A data carrier system according to claim 6, wherein the AC magnetic field region defines the communication area of the fixed facility as having an approximate rectangular configuration with a predetermined width and a major axis extending in a direction in which the data carrier moves.

8. A data carrier system according to claim 7, wherein the antenna comprises: a flat rectangular frame; and, a winding wound in the form of a vortex on the frame.

9. A data carrier system according to claim 8, wherein the winding has a nonuniform density from a central portion of the frame toward an outer side thereof.

10. A data carrier system according to claim 4, wherein the common signal forming means includes at least one external AC signal generating means for supplying an AC signal to the plurality of fixed facilities and includes signal input means in each of the fixed facilities for inputting AC signals from external AC signal generating means.

11. The data carrier system of claim 4 comprising a data demodulating circuit in each of the fixed facilities, each said demodulating circuit including a current-voltage converter for converting current flowing through the antenna coil into a voltage, a voltage subtraction circuit for extracting a difference voltage between said converted voltage and the AC voltage output from the AC signal generating circuit; and a synchronous rectifying circuit for detecting and rectifying said difference voltage.

12. A data carrier system according to claim 4, wherein a plurality of said fixed facilities are adjacent one another, and the control means adjusts the frequency and phase of said AC signal in one fixed facility relative to the frequency and phase of other fixed facilities.

13. A data carrier system according to claim 4, wherein said received signal detecting means includes a current-voltage converter circuit that converts an induced current flowing through said antenna into a voltage signal.

14. A data carrier system according to claim 4, further comprising a voltage adjusting circuit for forming a reference signal from said AC signal, and a subtraction circuit for extracting a difference signal between said received signal and the reference signal, said difference signal being detected by said synchronous detecting means.

15. A data carrier system according to claim 14, further comprising:
an amplitude difference detecting circuit for detecting a difference in amplitude between the received signal and the reference signal for outputting amplitude difference data, and an AC signal adjusting circuit for bringing the amplitudes into agreement between the received signal and the reference signal in response to said amplitude difference data.

16. A data carrier system according to claim 14, further comprising, a phase difference detecting circuit for detecting a difference in phase between said received signal and the reference signal and for outputting phase difference data, and said AC signal adjusting circuit having a phase adjusting circuit for bringing the phases between the received signal and the reference signal into agreement in response to said phase difference data.

17. A data carrier system according to clam 10, comprising an individual AC generating means in at least one of the plurality of fixed facilities, the same AC signals being fed from the at least one of the fixed facilities having the individual AC signal generating means to other fixed facilities.

18. A data carrier system according to claim 17, wherein the control means provided in each of the plurality of fixed facilities has both the individual AC signal generating means contained in the fixed facilities and the signal input means for inputting the AC signals from the external AC signal generating means.

19. A data carrier system according to claim 18, wherein each of the plurality of fixed facilities includes the individual AC signal generating means that serves as a clock for an internal circuit of the respective fixed facility and a switching means for switching the signal from the signal input means.

20. A data carrier system according to claim 10, wherein the control means provided in each of the fixed facilities includes both the individual AC signal generating means contained in the fixed facilities and the signal input means for inputting the AC signals from the external AC signal generating means.

21. A data carrier system according to claim 20, wherein the fixed facilities has the individual AC signal generating means that serves as a clock for the internal circuit and a switching means for switching the signal from the signal input means.

22. A data carrier system according to claim 10, wherein the signal input means provided in each of the fixed facilities has an insulating means that insulates a direct current flow between the external AC signal generating means provided outside of the fixed facilities and the fixed facilities.

23. In a fixed facility used in a power sourceless electromagnetically coupled data carrier system, an antenna for a data carrier generates an AC electromagnetic field to feed electric power to the data carrier and has a winding that is wound in a vortex shape on nearly a plane, the density of said winding being lower near the center of vortex and higher toward the outer periphery of the vortex.

24. A data carrier system comprising a power sourceless electromagnetically coupled data carrier and fixed facilities that effect two-way data communication relative to said data carrier, wherein a synchronizing signal is transmitted from a synchronizing signal generating means contained in a particular fixed facility to a plurality of other fixed facilities in order to render to be the same among the plurality of fixed facilities the frequencies and phases of AC magnetic fields that are generated from the fixed facilities to transmit electric power and data to the data carrier, the synchronizing signal being transmitted from the synchronizing signal generating means contained in said particular fixed facility to other fixed facilities through an insulation means that is insulated in a DC manner from the synchronizing signal generating means.

25. A data carrier system according to claim 24, wherein the synchronizing signal generating means contained in said particular fixed facility is driven by at least two or more different power sources.

26. A fixed facility in a data carrier system wherein an AC magnetic field is radiated from an antenna coil to feed electric power and data to a data carrier in the form of the AC magnetic field, a change in the AC magnetic field generated by the data carrier is detected through the antenna coil, and the data transmitted from the data carrier is received, the fixed facility comprising AC signal generating means for generating an AC voltage output;

a signal modulating circuit for modulating the AC voltage output to superpose the data;

an antenna drive circuit for amplifying the modulated AC voltage and feeding the amplified electric power to said antenna coil to generate the AC magnetic field;

a synchronous detecting circuit for detecting and rectifying the current flowing through the antenna coil to demodulate the data from the data carrier received by the antenna coil, said synchronizing detecting circuit being brought into synchronism with the AC voltage output from said AC signal generating means; and adjusting means for adjusting the frequency and phase of the AC voltage output from said AC signal generating circuit.

* * * * *

UNITED STATES PATENT AND TRADEMARK OFFICE
CERTIFICATE OF CORRECTION

PATENT NO. : 5,570,086
DATED : October 29, 1996
INVENTOR(S) : Tadashi HANAOKA et al.

It is certified that error appears in the above-indentified patent and that said Letters Patent is hereby corrected as shown below:

Claim 21, column 29, line 43, "fixed facilities has" should read --fixed facilities have--.

Claim 23, column 30, line 5, delete "nearly".

Signed and Sealed this

Eighth Day of April, 1997

Attest:

Attesting Officer

BRUCE LEHMAN

Commissioner of Patents and Trademarks